United States Patent [19]

Mitani et al.

[11] Patent Number: 5,434,706
[45] Date of Patent: Jul. 18, 1995

[54] TRANSMISSION TYPE SCREEN AND METHOD OF MANUFACTURING THEREOF

[75] Inventors: Katsuaki Mitani, Ibaraki; Noboru Yasumatsuya, Katano; Ichiro Matsuzaki; Hiroshi Kuwada, both of Niigata, all of Japan

[73] Assignees: Matsushita Electric Industrial Co., Ltd., Osaka; Kuraray Co., Ltd., Okayama, both of Japan

[21] Appl. No.: 974,524

[22] Filed: Nov. 12, 1992

[30] Foreign Application Priority Data

Nov. 15, 1991 [JP] Japan .................................. 3-300592
Nov. 15, 1991 [JP] Japan .................................. 3-300595
Nov. 15, 1991 [JP] Japan .................................. 3-300605

[51] Int. Cl.⁶ ............................................. G03B 21/60
[52] U.S. Cl. ..................................... 359/457; 359/596
[58] Field of Search ............... 359/453, 457, 596, 599

[56] References Cited

U.S. PATENT DOCUMENTS 4,919,515  4/1990  Hasegawa et al. .................. 350/128
5,066,099  11/1991 Yoshida et al. .
5,196,960  3/1993  Matsuzuki et al. .................. 359/453

FOREIGN PATENT DOCUMENTS 0281690A  9/1988  European Pat. Off. .

OTHER PUBLICATIONS

Patent Abstracts of Japan, vol. 15, No. 180, (P-1199) 9 May 1991 & JP-A-03 039 944 (Hitachi) 10 Feb. 1991.

Primary Examiner—Howard B. Blankenship
Assistant Examiner—D. P. Malley
Attorney, Agent, or Firm—Stevens, Davis, Miller & Mosher

[57] ABSTRACT

A lenticular lens provided on the viewer side of a transmission type screen is composed of at least two layers, that is, a surface layer and a base layer at least one of which contains a light dispersing material, and a visible light absorbing material is mingled in at least one of these two layers, or in the light dispersing material, thereby enhancing the image contrast of the transmission type screen.

2 Claims, 25 Drawing Sheets

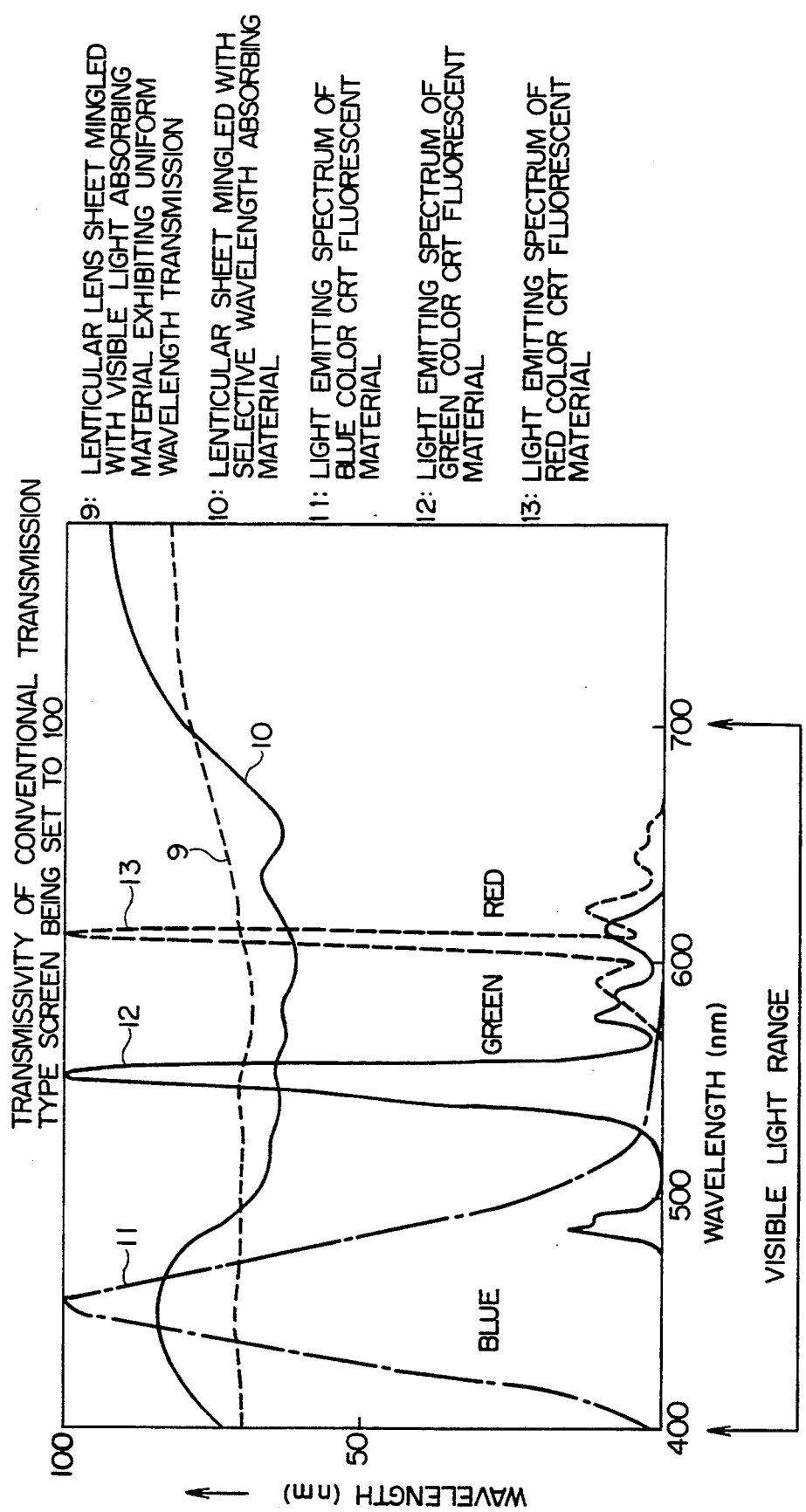

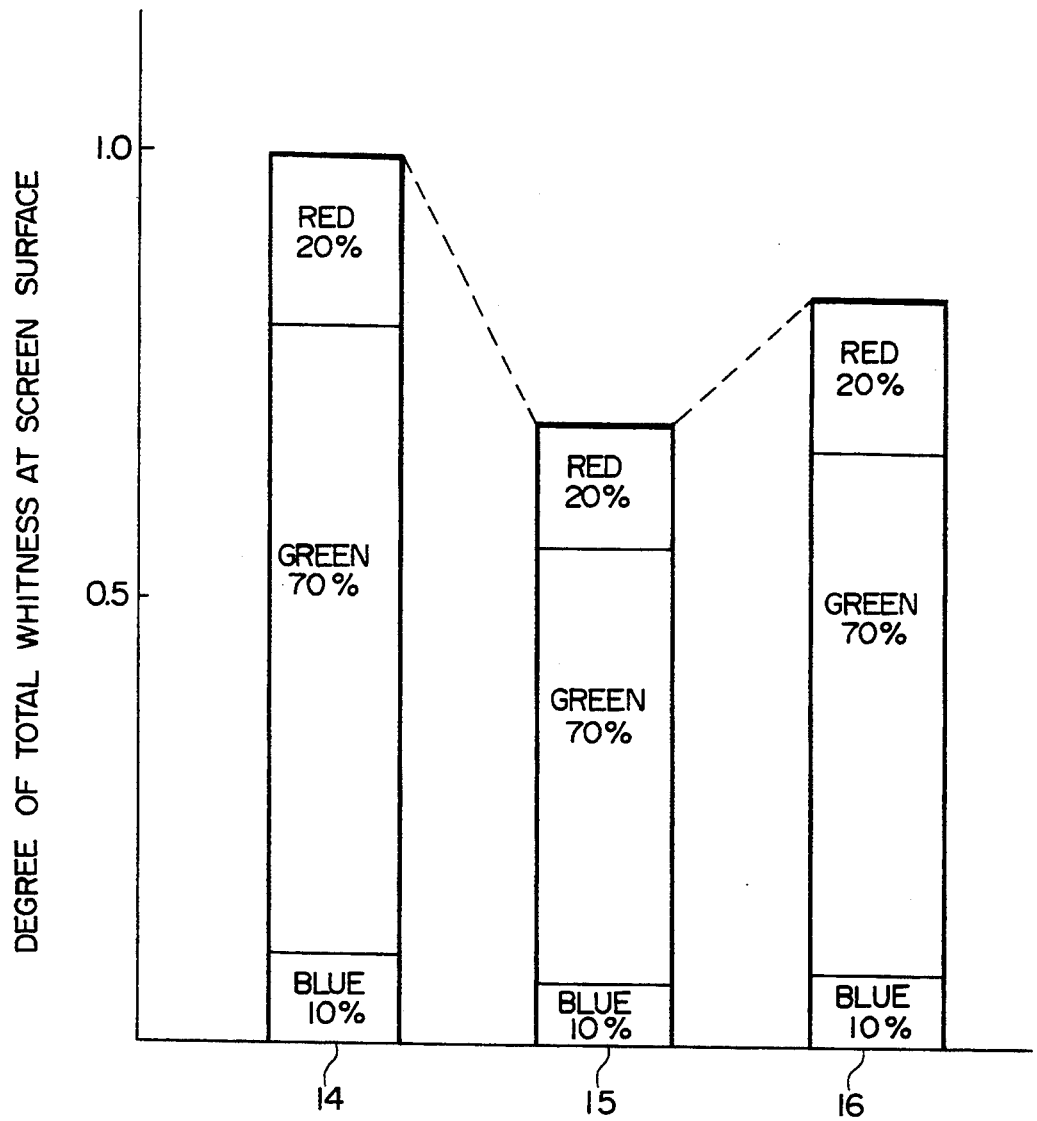

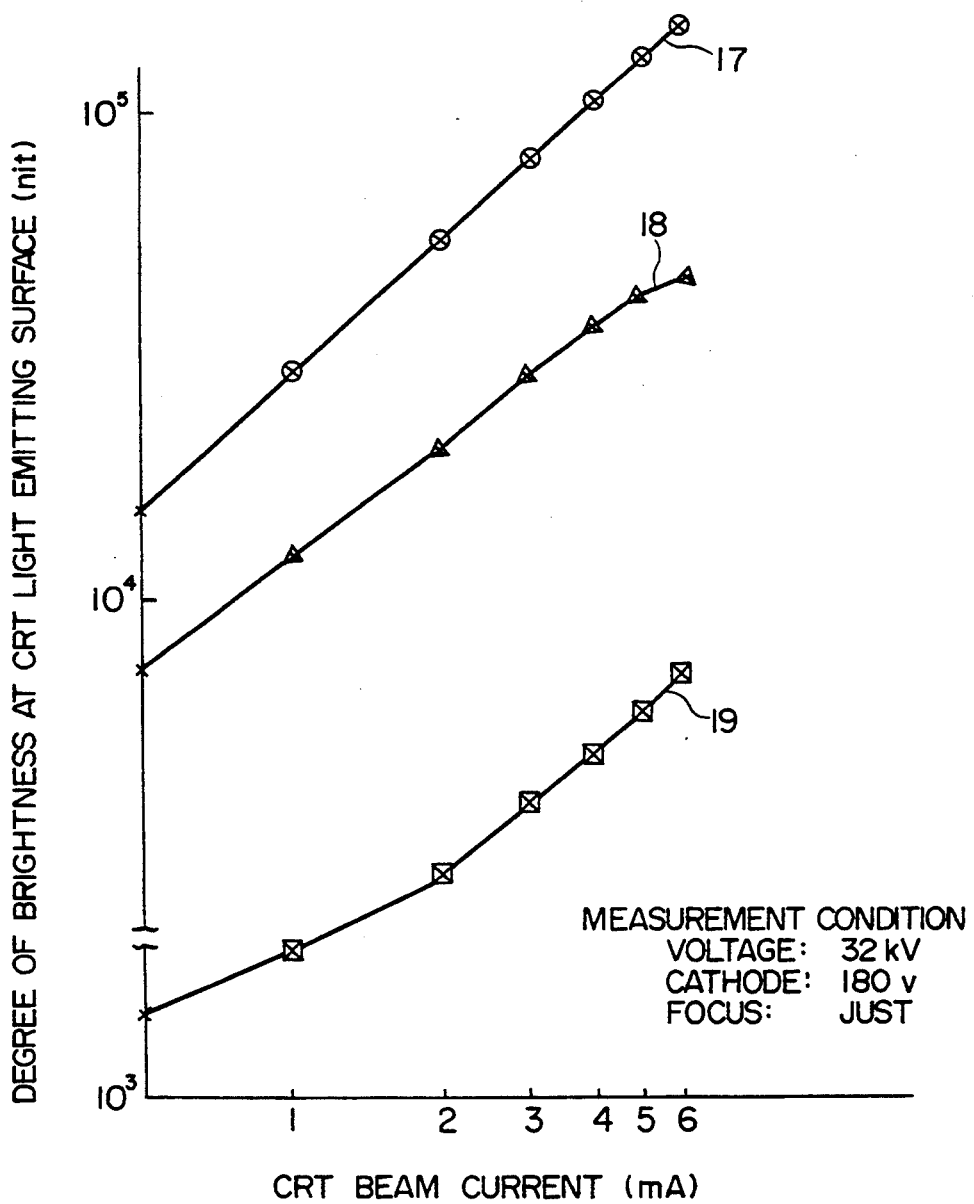

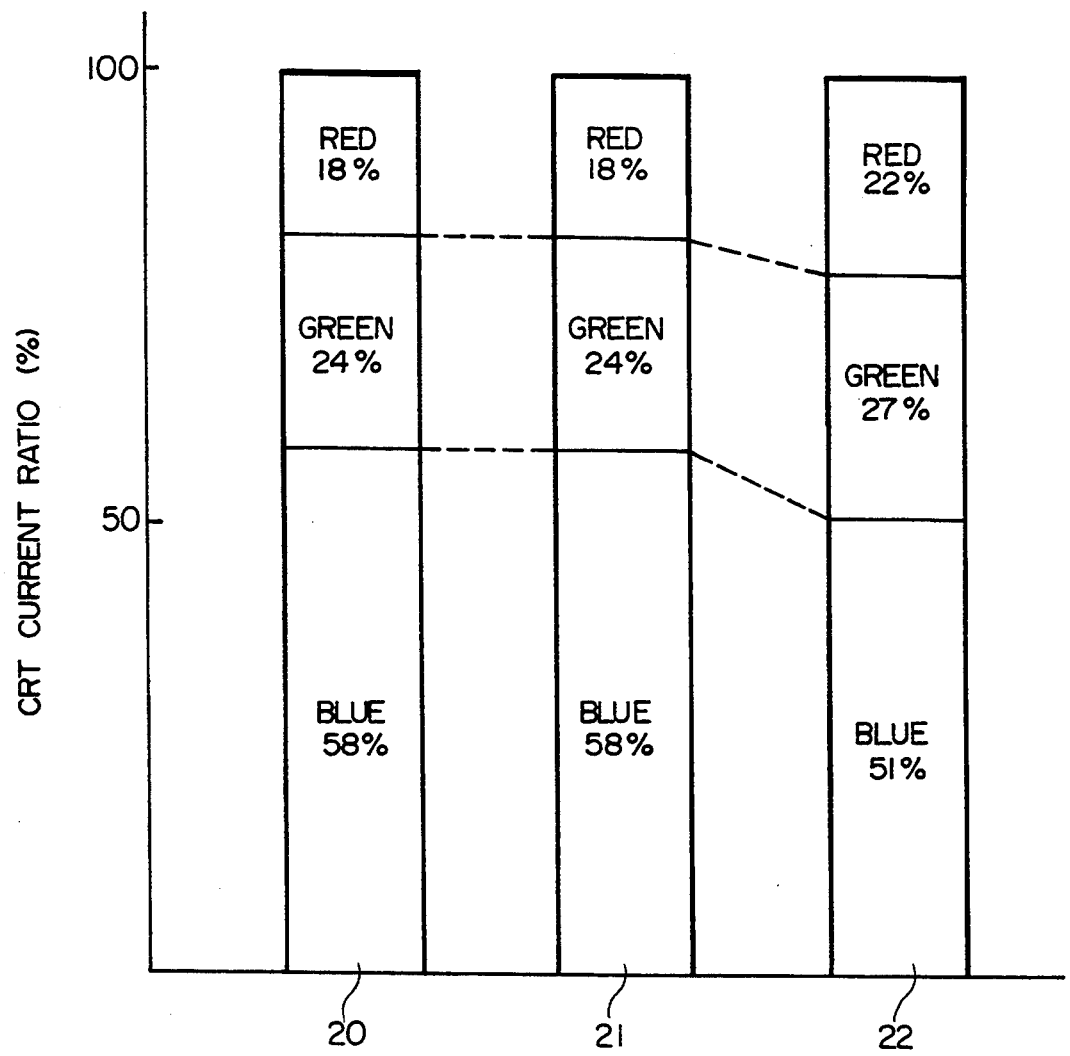

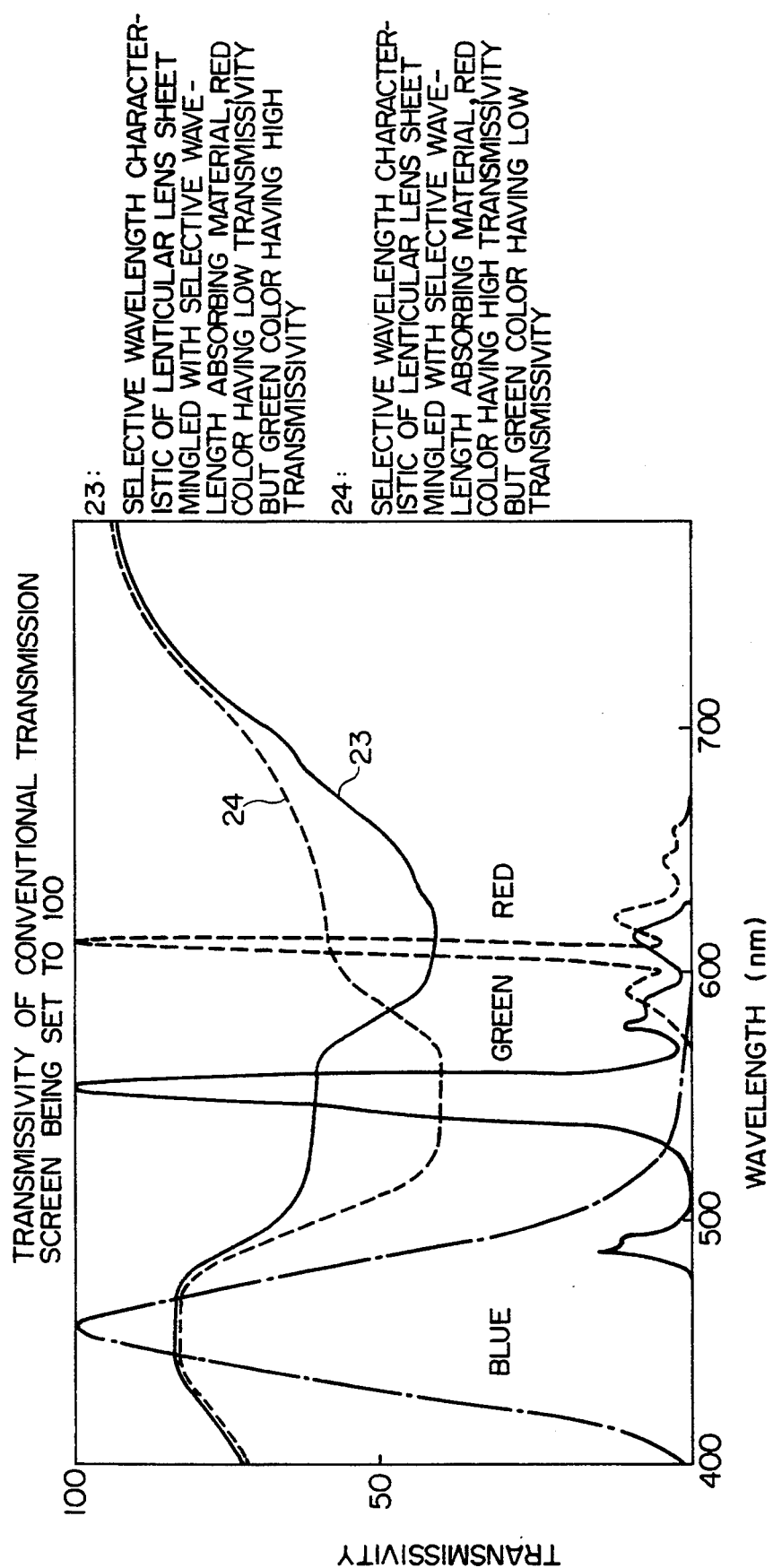

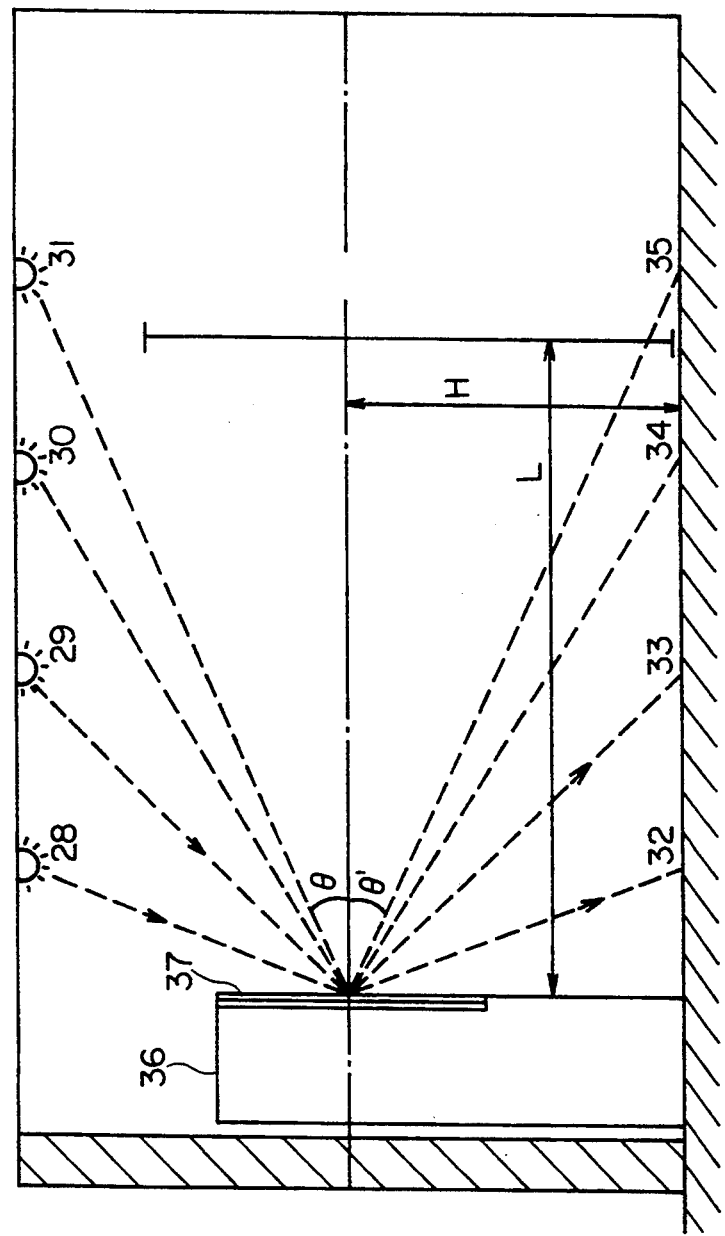

FIG. 9
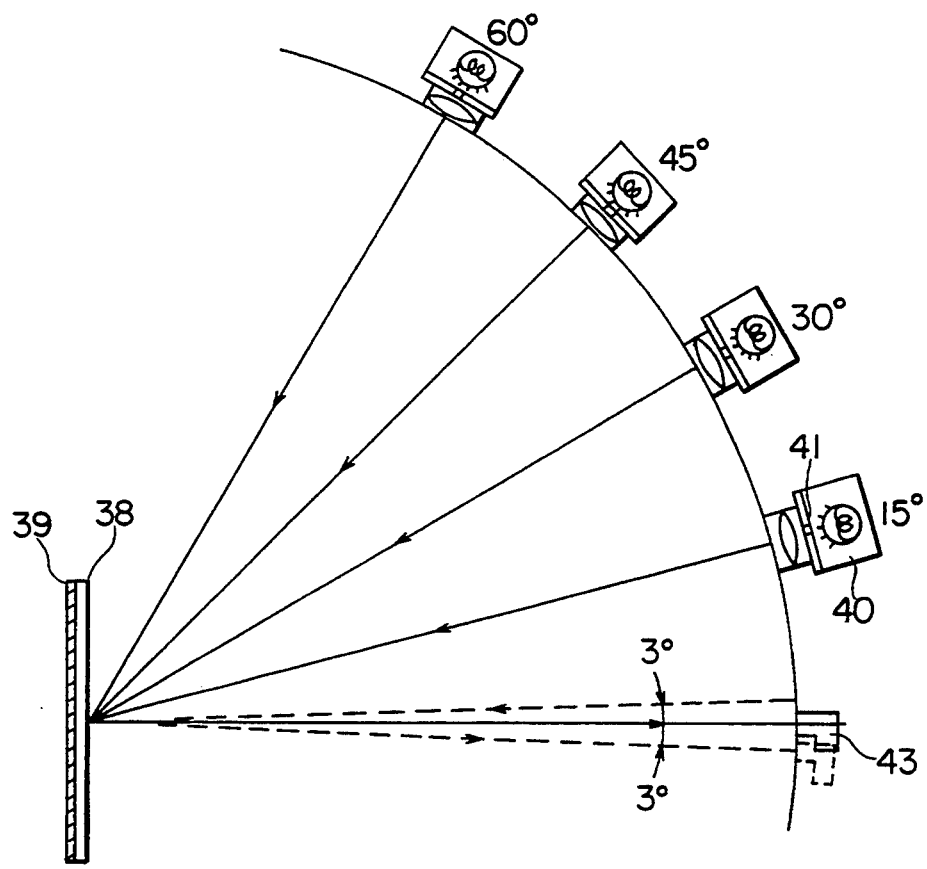
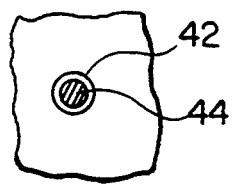

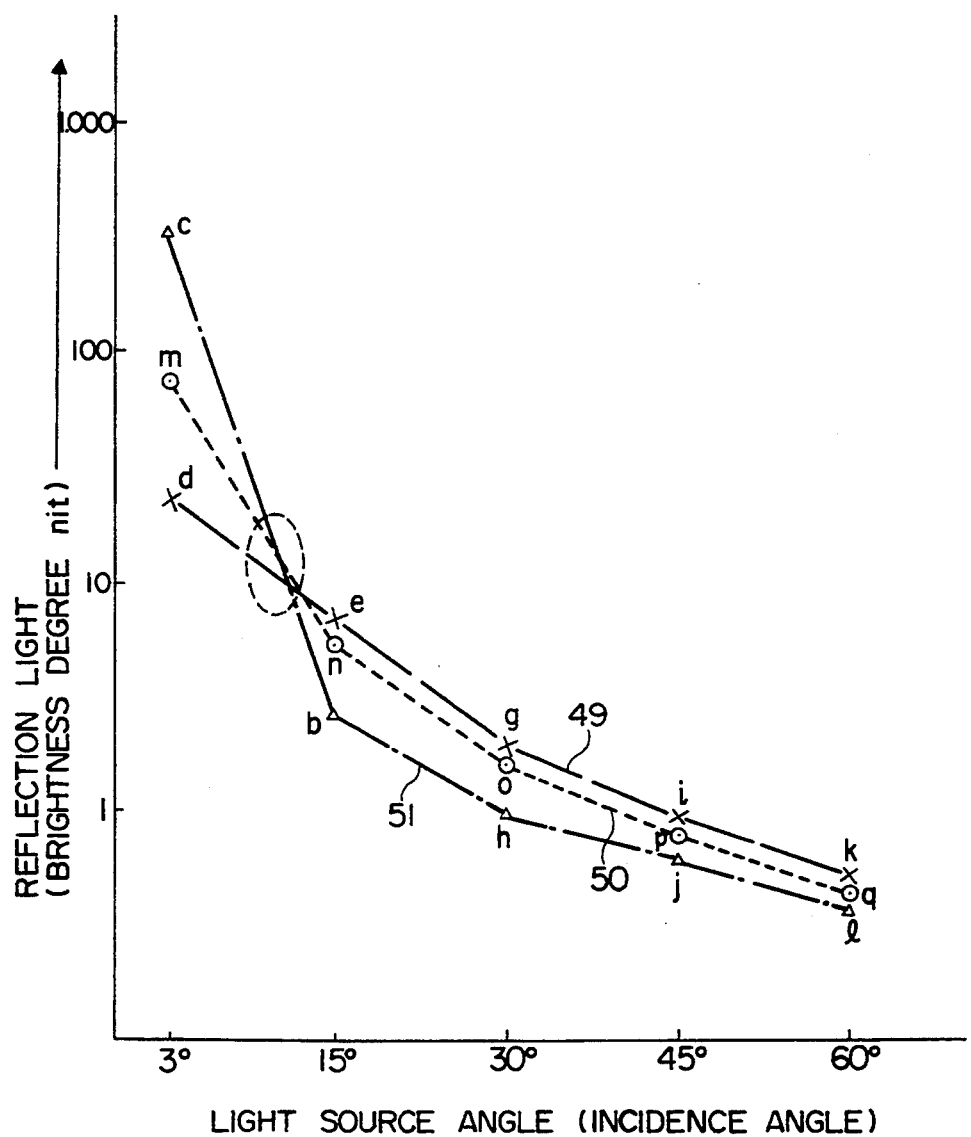

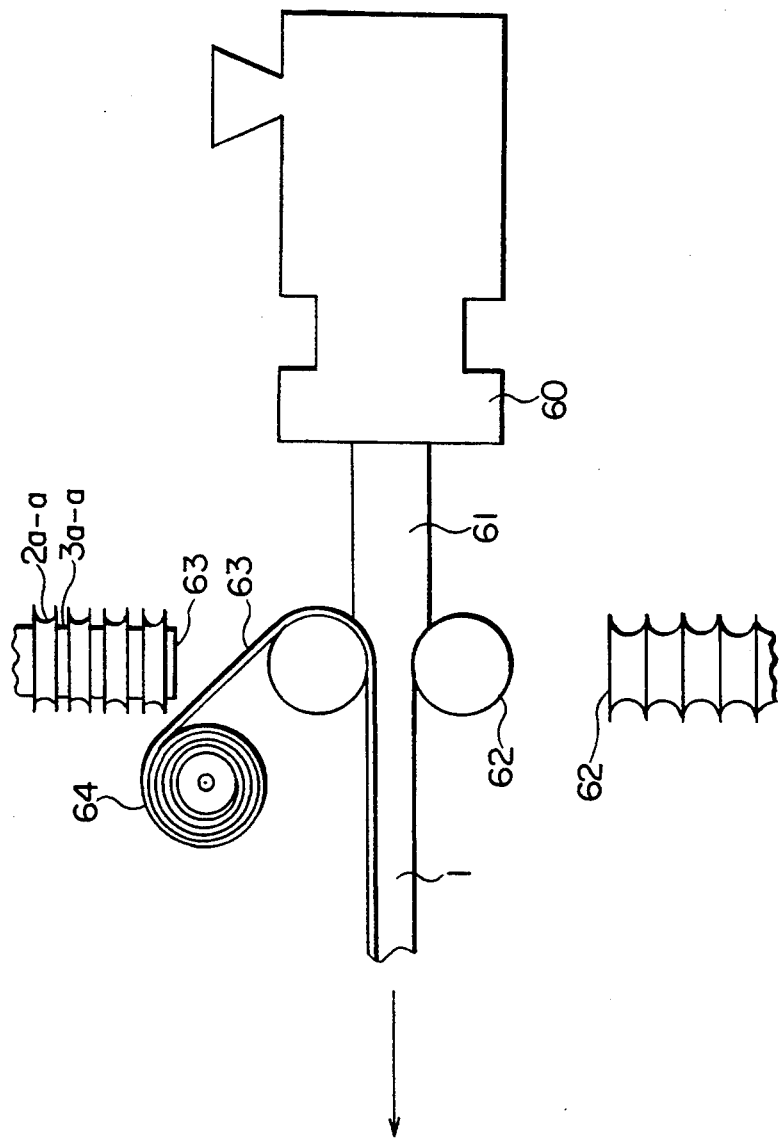

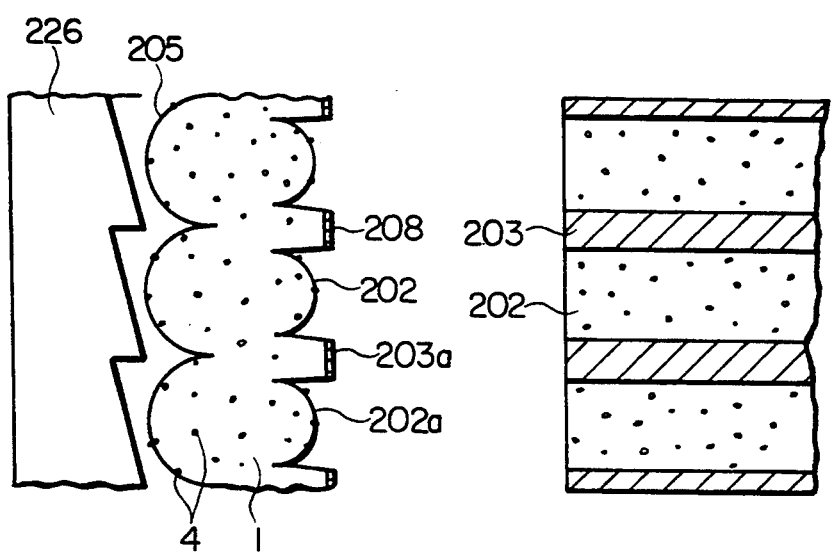

FIG. 18A
FIG. 18B
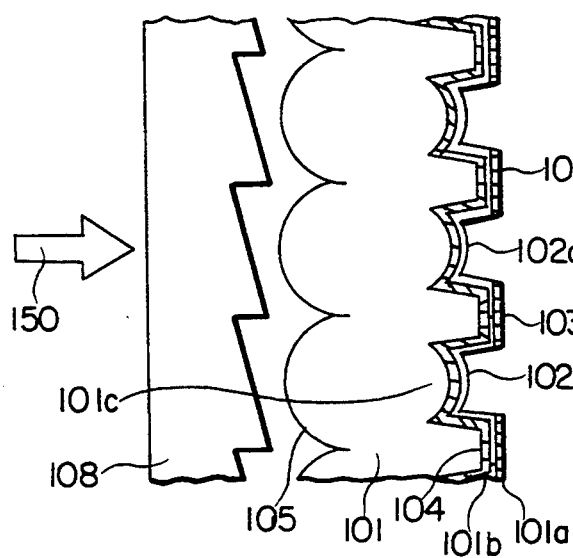
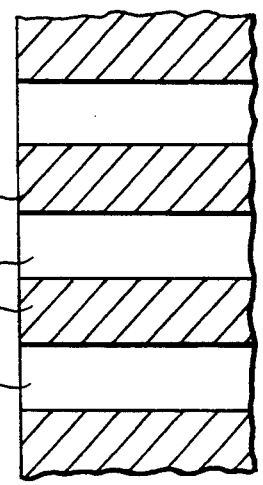

TRANSMISSION TYPE SCREEN AND METHOD OF MANUFACTURING THEREOF

BACKGROUND OF THE INVENTION

1. Field of the Invention

The present invention relates to a transmission type screen adapted to be used for a projection type television receiver, and also relates to a method of manufacturing thereof. In particular, the present invention relates to a transmission type screen whose contrast is not lowered substantially even under external light illumination.

2. Description of the Related Art

As shown in FIG. 25A, a transmission type screen having such an arrangement that a lenticular lens sheet 48 is superposed on the front surface of a Fresnel lens sheet 26 having a Fresnel lens 45 has been conventionally used.

Further, the lenticular sheet 48 is made of a base material mixed therein with a light dispersing material such as glass or polymeric materials, and is formed at its both surfaces with cylindrical lenticular lenses 2, 5. Further, non-light converging parts of the light emission side lenticular lens 5 are formed respectively thereon with protrusive light absorbing layers 3 (which will be hereinbelow denoted as "black strips") at predetermined pitches in order to prevent the contrast of the transmission screen from being lowered by the external light.

However, in general, the above-mentioned conventional lenticular lens sheet 48 is mingled therein with the light dispersing material 4 such as glass beads or polymeric beads which are projected in part from the outer surfaces of the cylindrical lenses 5 and the black stripes 3 defined by the protrusive non-light converging parts, as shown in FIG. 25b, in order to focus an image and to enlarge the vertical viewing angle range.

Further, slight concavities and convexities are formed on the outer surface of a die for forming the surface of the lenticular lens sheet which is nearest to the viewer. These concavities and convexities are transferred to the outer surface of the lenticular lens sheet during molding so as to form an irregular reflection surface thereon in order to prevent objects surrounding the screen from being reflected therein.

Accordingly, when the external light is irradiated onto the light emission side surface of the lenticular lens sheet 48, irregular reflection occurs causing the screen surface to be whitish and the contrast to be deteriorated. Further, in order to improve the contrast of the screen even under irradiation of the external light, a mirror surface plate made of glass or transparent plastic which lowers the light transmissivity is attached to the front surface of the screen. However, this further causes external light (from fluorescent lamps, incandescent lamps, surrounding persons, windows or the like) to be highly reflected in the screen, and accordingly, the visibility of an image thereon becomes lower.

SUMMARY OF THE INVENTION

The present invention is devised in order to solve the above-mentioned problems inherent to the conventional transmission type screen, and accordingly, an object of the present invention is to provide a transmission type screen including a lenticular lens sheet having a mirror-like lens surface which can prevent irregular reflection by external light so as to prevent lowering of the contrast of the screen within a suitable viewing angle range and to prevent reflection of the external light. Further, another object of the present invention is to provide a method of manufacturing the transmission type screen as mentioned above.

Lenticular lens sheets used in the transmission type screen according to the present invention, can be classified into four kinds in view their fundamental configurations, but either of them has the lens surface nearest to the viewer, which verges on a mirror surface as far as possible. Further, throughout the explanation which will be made hereinbelow, a double sheet type transmission screen having a Fresnel lens sheet and a lenticular lens sheet which is composed of incident side lenses, emission side lenses formed in parts where light is converged by the incident side lenses, and light absorbing layers formed in parts where no light is converged, will be mainly concerned. However, it is noted that similar technical effects and advantages to that obtained by this transmission screen can be also obtained by a double sheet type transmission screen including a lenticular lens sheet having no lenses on the incident side thereof, or a single sheet type transmission screen having a Fresnel lens formed on the rear surface thereof and lenticular lenses formed on the viewer side surface thereof.

According to the first aspect of the present invention, there is provided a single layer lenticular lens sheet having a lens surface nearest to the viewer, on which no slight concavities and convexities are formed so that irregular reflection of external light is reduced in order to prevent reflected light by the external light from coming out in a suitable viewing angle range, thereby it is possible to provide an image having an enhanced contrast with no reflection to the viewer. It is noted that light dispersing micro particles contained in the lenticular sheet are slightly projected from the surface of the lenticular lens sheet in the case of forming the transmission type screen with the use of an extrusion molding process, and accordingly the viewer side lens surface cannot be made to be mirror-surface-like completely. Thus, it is impossible to completely eliminate irregular reflection of external light.

Further, according to the first aspect of the present invention, there is provided an extruder for molding a lenticular lens having the above-mentioned configuration. That is, a transparent resin material containing therein a light dispersing slight particles having a predetermined density is melted by the extruder, and is then extruded by a die. The extruded molten resin material is cooled by roll dies and is formed into a sheet-like shape. The roll die for forming the emission side lenses has a surface which is not formed thereon with slight concavities and convexities formed by a blast process or the like, but has a surface which is obtained directly by cutting with the use of a cutting tool. Accordingly, the surface of the lenticular sheet formed by this roll die can be substantially regarded as a mirror-surface. With the use of the roll die for forming the incidence side lens pattern and the roll die for forming the emission side lens pattern, the emission side lens surface has less projection of the light dispersing fine particles since this surface leaves the associated roll die after it is cooled by the latter. Further, by decreasing the temperature of the roll dies as low as possible and by lowering the production speed of the sheet, the temperature of the emission side lens surface can be lowered at the time when it leaves the associated roll dies, and accordingly, it is possible to reduce the projection of the light dispersing fine particles.

According to the second aspect of the present invention, there is provided a double layer type lenticular lens sheet composed of a surface layer which does not contain light dispersing fine particles and a base layer containing the light dispersing fine particles. With this arrangement in which the surface layer conceals the light dispersing fine particles which are projected slightly from the emission side lens surface of the lenticular lens as is mentioned above concerning the first aspect of the present invention, it is possible to form an emission side lens surface which is completely mirror-like in comparison with the first aspect of the present invention.

Further, according to the second aspect of the present invention, there is provided a co-extrusion machine for molding the lenticular lens sheet having the above-mentioned configuration. This co-extrusion machine incorporates an additional extruder for forming the surface layer so that a resin material to be formed into the outer surface layer and a resin material to be formed into the base layer are merged together before they are extruded from a die, that is, they are extruded from the die in a completely united condition, and are then cooled by roll dies so as to be formed into a lenticular lens sheet. The roll die for forming the emission side lenticular lenses is processed similar to that explained mentioned above concerning the first aspect of the present invention.

According to the third aspect of the present invention, there is provided a double layer type lenticular lens composed of an outer surface layer which contains light dispersing fine particles and a base layer which does not contain the light dispersing fine particles, and also having an emission side lens surface on which no fine concavities and convexities are formed, similar to the first aspect of the present invention, whereby it is possible to reduce irregular reflection of external light so that the reflection of the external light is prevented from entering into a suitable viewing angle range, and accordingly an image having an enhanced contrast and less reflection can be offered to the viewer. The lenticular lens sheet according to this third aspect of the present invention, has a less deterioration in resolution in comparison with the lenticular lens sheet according to the first aspect of the present invention. Further, it has been known that a moire caused by the Fresnel lens and the lenticular lens can be reduced by providing a light dispersing layer in the lenticular lens sheet as a position distant from the emission side surface of the Fresnel lens sheet as far as possible. In view of this fact, the lenticular lens sheet according to this aspect of the present invention is effective for reducing the moire since the light dispersing layer is provided mainly on the emission side. The lenticular lens sheet according to this aspect of the present invention can be produced, similar to those of the afore-mentioned aspects.

According to the fourth aspect of the present invention, there is provided a triple layer type lenticular lens sheet composed of an outer layer which does not contain light dispersing fine particles, an intermediate layer which contains the light dispersing fine particles and the basic layer which does not contain the light dispersing fine particles. With this arrangement in which the surface layer conceals the light dispersing fine particles which are projected slightly from the emission side surface of the lenticular lens sheet as is that mentioned above concerning third aspect of the present invention, the lenticular lens sheet has an emission side lens surface which is completely mirror-like in comparison with the third aspect of the present invention.

Further, according to the fourth aspect of the present invention, there is provided a co-extrusion machine for molding the above-mentioned lenticular lens sheet having the above-mentioned configuration. This co-extrusion machine incorporates additional extruders for molding the outer surface and the intermediate surface so that resin materials formed into these type layers are completely merged together, and are extruded from dies and cooled by roll dies so as to be formed into a sheet-like shape. The roll die for forming the emission side lens surface is processed by a method similar to the method of producing the lenticular lens sheet according to the first aspect of the present invention. Further, the lenticular lens sheet according to the fourth aspect of the present invention can be also produced as follows: after formation of the lenticular lens sheet according to the third aspect of the present invention by co-extrusion, the lenticular lens sheet is subjected to dip-coating or flow-coating so as to form a surface layer which does not contain the light dispersing fine particles at the outer surface of the lenticular lens sheet.

With the lenticular lens sheet of these four kinds in which a light dispersing material and a visible light absorbing materials are contained in a layer which is nearest to the viewer, the light absorptance in a visible light wavelength range is increased so as to improve the contrast with respect to external light. In this arrangement, coloring matter, pigment, carbon, metal salt or the like which has a compatibility with thermoplastic resin can be used as a material for absorbing visible light.

Further, the absorption spectrum of the material for absorbing visible light has not to be always flat, and further, there may be presented any wavelength characteristic, peak in order to enhance the intensity ratios of three color CRTs used in a projection type television, receiver, the color purity or the like.

Further, the outer surface of the light absorbing layer formed on the light emission side of the lenticular lens sheet is made to be mirror-surface-like as possible as it can so as to prevent reflection of external light from entering into a suitable viewing angle range, thereby it is possible to improve the contrast with respect to the external light.

With this arrangement, according to the present invention, a lenticular lens having a simple and cheap configuration, for a transmission type screen, which can enhance the contrast with respect to external light, can be provided.

In addition to the above-mentioned features, technical effects and advantages, other features, technical effects and advantages of the present invention may be understood from the following description which will be made with reference to the accompanying drawings in which:

BRIEF DESCRIPTION OF THE DRAWINGS

FIGS. 1A to 1C are views illustrating a part of a transmission type screen in a first embodiment of the present invention, in which FIGS. 1A is a cross-sectional view, FIG. 1B is a front view and FIG. 1C is a transverse sectional view;

FIG. 2 is a graph showing wavelength characteristics obtained by the configurations of first and fifth embodiments of the present invention in which a visible light absorbing material is mingled, FIGS. 3A to 3C are views illustrating a part of a transmission type screen in a second embodiment of the present invention, in which FIG. 3A is a cross-sectional view, FIG. 3B is a front view and FIG. 3C is a transverse sectional view;

FIG. 4 is a graph showing relative whiteness degrees of the configurations of the first and fifth embodiment of the present invention;

FIG. 5 is a graph showing relationships between brightness and beam currents of red, green and blue color CRTs;

FIG. 6 is a graph showing current ratios of red, green and blue color CRTs in the embodiments of the present invention and a conventional example;

FIG. 7 is a graph showing wavelength characteristics of a lenticular lens in the fifth embodiment of the present invention;

FIG. 8 is a schematic side view illustrating an example of installation of a projection type television receiver;

FIG. 9 is a schematic view illustrating a method of measuring the intensity of reflection with respect to an incident angle of external light;

FIG. 10 is a graph showing results in measurement of the intensity of reflection with respect to the incident angle of external light with the use of a conventional projection type television receiver;

FIGS. 11A to 11C are views illustrating a part of a transmission type screen in a sixth embodiment of the present invention, in which FIG. 11A is a cross-sectional view, FIG. 11B is a front view and FIG. 11C is a transverse sectional view;

FIGS. 12A to 12C are views illustrating a part of a transmission type screen in a seventh embodiment of the present invention, in which FIG. 12A is a cross-sectional view, FIG. 12B is a front view and FIG. 12C is a transverse sectional view;

FIG. 13 is a schematic view illustrating an apparatus for producing lenticular lens sheets in the first to eighth embodiments of the present invention;

FIGS. 14A to 14C are views illustrating a part of a transmission type screen in a third embodiment of the present invention, in which FIG. 14A is a cross-sectional view, FIG. 14B is a front view and FIG. 14C is a transverse sectional view;

FIGS. 15A to 15C are views illustrating a part of a transmission type screen in a fourth embodiment of the present invention, in which FIG. 15A is a cross-sectional view, FIG. 15B is a front view and FIG. 15C is a transverse sectional view;

FIGS. 16A to 16C are views illustrating a part of a transmission type screen in a ninth embodiment of the present invention, in which FIG. 16A is a cross-sectional view, FIG. 16B is a front view and FIG. 16C is a transverse sectional view;

FIGS. 17A to 17B are views illustrating a tenth embodiment of the present invention, in which FIG. 17A is a cross-sectional view, and FIG. 17B is a front view;

FIGS. 18A to 18B are views illustrating an eleventh embodiment of the present invention, in which FIG. 18A is a cross-sectional view, and FIG. 18B is a front view;

FIGS. 19A to 19C are views illustrating a twelfth embodiment of the present invention, in which FIG. 19A is a cross-sectional view, FIG. 19B is a front view and FIG. 19C is a transverse sectional view;

FIGS. 20A to 20B are views illustrating a thirteenth embodiment of the present invention, in which FIG. 20A is a cross-sectional view, and FIG. 20B is a front view;

FIGS. 21A to 21B are views illustrating a fourteenth embodiment of the present invention, in which FIG. 21A is a cross-sectional view, and FIG. 21B is a front view;

FIGS. 22A to 22B are views illustrating a fifteenth embodiment of the present invention, in which FIG. 22A is a cross-sectional view, and FIG. 22B is a front view;

FIGS. 23A to 23B are views illustrating a sixteenth embodiment of the present invention, in which FIG. 23A is a cross-sectional view, and FIG. 23B is a front view;

FIGS. 25A to 25B are views illustrating a conventional lens sheet, in which FIG. 25A is a perspective view, and FIG. 25B is a partial sectional view.

DETAILED DESCRIPTION OF THE PREFERRED EMBODIMENTS

First Embodiment

Figure 1A:
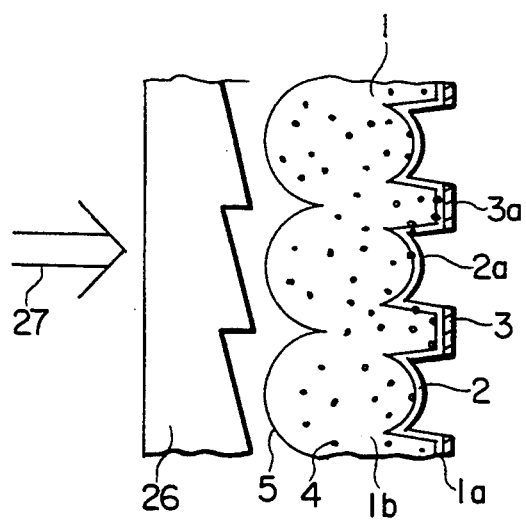
Figure 1B:
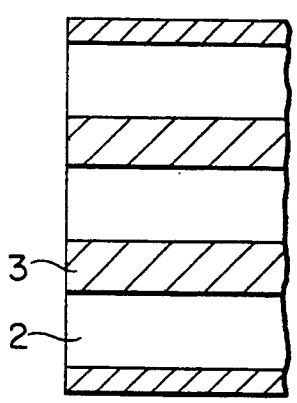
Figure 1C:
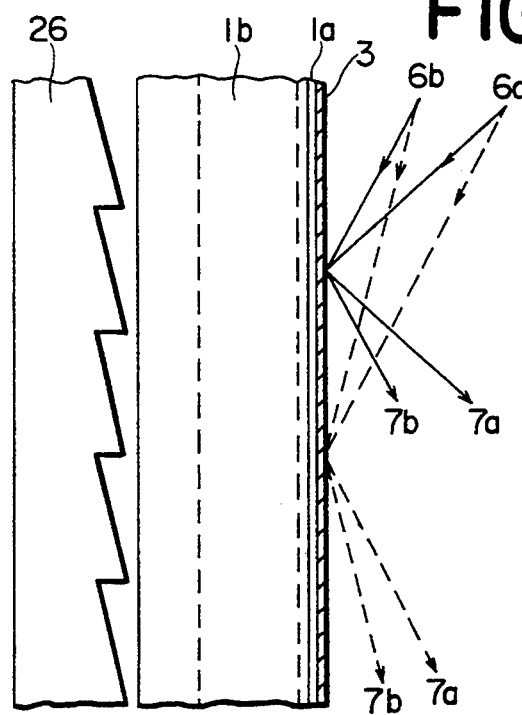

Referring to FIGS. 1A to 1C which show a transmission type screen in a first embodiment of the present invention, the transmission type screen is a double sheet type in which a Fresnel lens sheet 26 is arranged on the light incidence side upon which output light 27 from a cathode-ray tube is incident, and a lenticular lens sheet 1 is arranged on the light emission side (or viewer side).

The lenticular lens sheet 1 is formed at the incidence side one of its principal planes with lenticular lenses 5 and at the emission side one thereof with lenticular lenses 2 that are located in parts to which light is converged by the incident side lenticular lenses 5, and with black stripes 3 with equal pitches, that are located in parts where no light is converged by the incident side lenticular lenses 5. Further, the lenticular lens sheet 1 located on the emission side is composed of two layers, that is, a surface layer 1a which is nearest to the viewer and which does not contain a light dispersing material, and a base layer 1b which contains the light dispersing material 4. Further, the surface layer 1a which is nearest to the viewer and which does not contain the light dispersing material contains a visible light absorbing material (which is not shown in the drawings). This visible light absorbing material absorbs external light so as to enhance the contrast with respect to the external light.

The external light contrast ratio (1C) of the lenticular lens sheet 1 in which 30% of the visible light absorbing material is mingled into the surface layer 1a so that a substantially uniform visible light transmissivity 9 which is substantially uniform although it is not actually flat in the visible light wavelength range (that is, range from 400 to 700 nm) can be obtained, is given as 1C in Table 1, with respect to the transmissivity of a conventional transmission type screen which is 100 as shown in FIG. 2.

TABLE 1

| External Light × | Contrast Ratio | | Screen Brightness | |
|---|---|---|---|---|
| Time (Screen Surface) | Measured | Effect | All White | Effect |
| Convent. Expl. (48C) | 1:22.4 | 100% | 210 nlt | 100% |

TABLE 1-continued

| External Light × Time (Screen Surface) | Contrast Ratio Measured | Effect | Screen Brightness All White | Effect |
|---|---|---|---|---|
| First Embodi. (1C) | 1:28.9 | 129% | 148 nlt | 70% |
| Fifth Embodi. (5C) | 1:28.3 | 131% | 170 nlt | 81% |

The lenticular lens sheet 1 which contains the visible light absorbing material, according to the present invention can enhance its external contrast ratio (1C) by 29% as understood from Table 1, but it lowers the brightness by 30% in comparison with the external light contrast ratio (48C) of the conventional lenticular lens sheet 48 which does not contain the light absorbing material. The above-mentioned results are caused by the inclusion of 30% of the visible light absorbing material. If the content rate of the visible light absorbing material would be increased, the external light contrast can be enhanced. However, an increase in the content rate of the visible light absorbing material incurs lowering of the brightness. Accordingly, it is desirable to select a content rate of the visible light absorbing material which can improve the contrast of the article while maintains a brightness which is minimum but actually necessary for the article.

Although the visible light absorbing material is mingled in the surface layer 1a which is nearest to the viewer and which does not contain the light dispersing material in this embodiment, it goes without saying that the visible absorbing material can be mingled into the base layer 1b which contains the light dispersing material or into the light dispersing material 4 itself, and further, the visible light absorbing material can be also mingled into the two layers, that is, the surface layer 1a and the base layer 1b, and into all of these two layer and the light dispersing material itself, thereby obtaining similar technical effects and advantages.

Second Embodiment

Figure 3A:
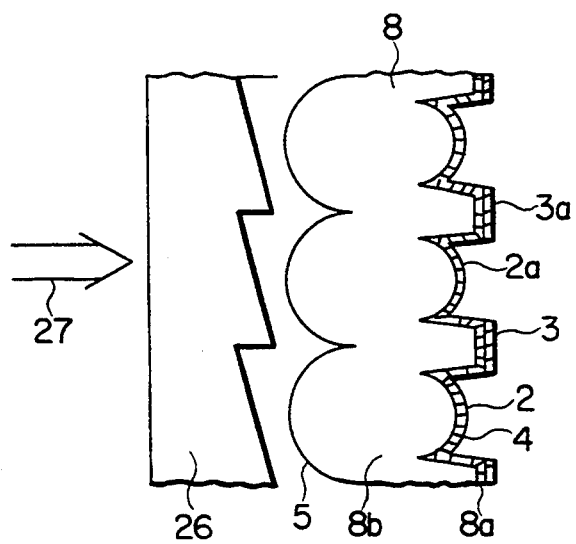
Figure 3B:
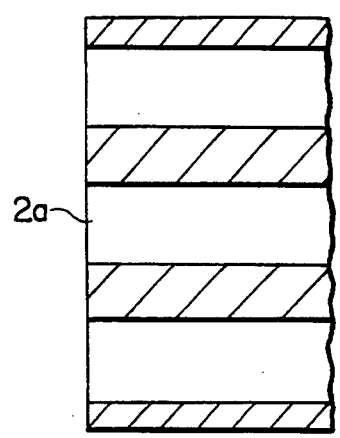
Figure 3C:
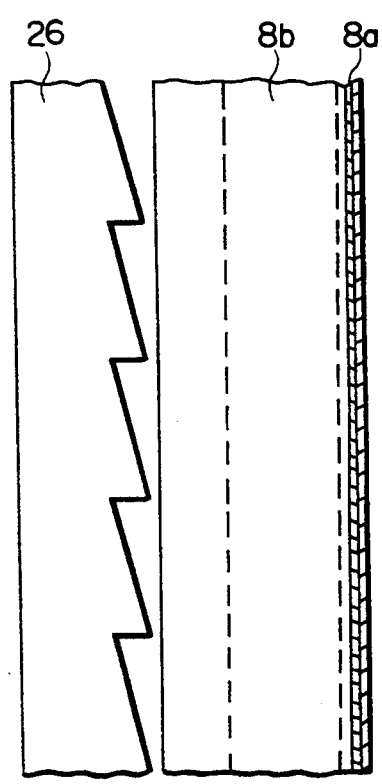

Next, explanation will be made of a second embodiment of the present invention with reference to FIGS. 3A to 3C which are cross-sectional, front and transverse sectional views illustrating a transmission type screen having a configuration in which a layer mingled therein with the light dispersing material is different from that in the first embodiment. Referring to FIGS. 3A to 3C, the transmission type screen is a double sheet type in which a Fresnel lens sheet 26 is arranged on the light incidence side upon which output light 27 from a cathode-ray tube is incident, and a lenticular lens sheet 8 is arranged on the light emission side (or viewer side).

A lenticular lens sheet 8 is formed at the incidence side one of its principal planes with lenticular lenses 5 and at the emission side one thereof with lenticular lenses 2 that are located in parts to which light is converged by the incident side lenticular lenses 5, and with black stripes 3 with equal pitches, that are located in parts where no light is converged by the incidence side lenticular lenses 5. Further, the lenticular lens sheet 8 located on the emission side is composed of two layers, that is, a surface layer 8a which is nearest to the viewer and which contains a light dispersing material 4, and a base layer 8b on the back side of the surface layer 8a, which does not contain the light dispersing material. Further, the surface layer 8a which is nearest to the viewer and which contains the light dispersing material 4 contains a visible light absorbing material. This visible light absorbing material absorbs external light so as to enhance the contrast with respect to the external light. Naturally, the visible light absorbing material can be contained in the light dispersing material 4.

In the above-mentioned second embodiment, although the visible light absorbing material is mingled in the surface layer 8a which is nearest to the viewer and which contains the light dispersing material, it goes without saying that the visible light absorbing material can be mingled in the base layer 8b which does not contain the light dispersing material so as to attain a similar improvement.

Third Embodiment

Figure 14A:
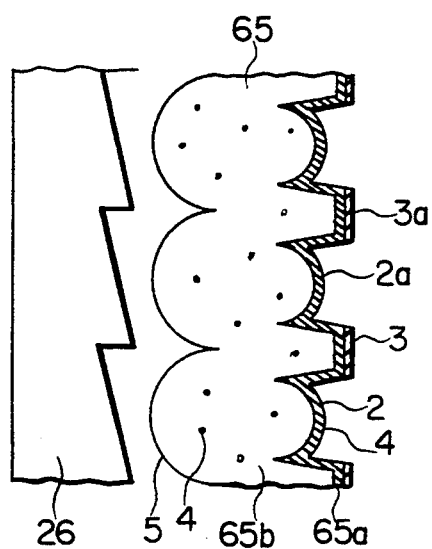
Figure 14B:
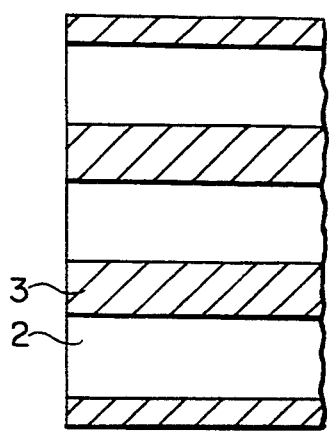
Figure 14C:
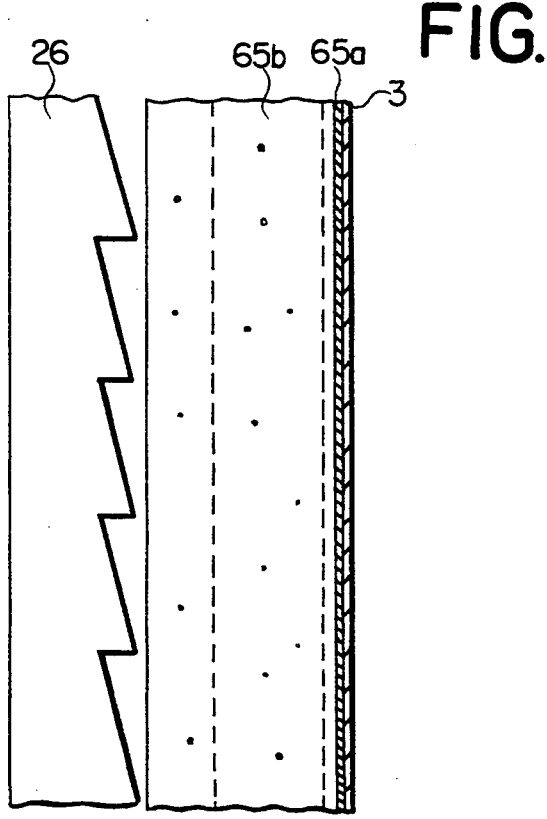

Next, explanation will be made of a third embodiment of the present invention with reference to FIGS. 14A to 14C which are cross-sectional, front and transverse sectional views illustrating a transmission type screen having a configuration in which a layer mingled therein with the light dispersing material is different from that in the first embodiment. Referring to FIGS. 14A to 14C, the transmission type screen is a double sheet type in which a Fresnel lens sheet 26 is arranged on the light incidence side upon which output light 27 from a cathode-ray tube is incident, and a lenticular lens sheet 65 is arranged on the light emission side (or viewer side).

A lenticular lens sheet 65 is formed at the incidence side one of its principal planes with lenticular lenses 5 and at the emission side one thereof with lenticular lenses 2 that are located in parts to which light is converged by the incident side lenticular lenses 5, and with black stripes 3 with equal pitches, that are located in parts where no light is converged by the incidence side lenticular lenses 5. Further, the lenticular lens sheet 65 located on the emission side is composed of two layers, that is, a surface layer 65a which is nearest to the viewer and which contains a light dispersing material 4, and a base layer 65b on the back side of the surface layer 65a, which contains a small content of the light dispersing material. Further, the surface layer 65a which is nearest to the viewer and which contains the light dispersing material 4 contains a visible light absorbing material. This visible light absorbing material absorbs external light so as to enhance the contrast with respect to the external light. Naturally, the visible light absorbing material can be contained in the light dispersing material 4. In one aspect of the invention, the light absorptivity property of the visible light absorbing material is an average (i) less than 50% in a wavelength range of 400–490 nm, and (ii) 30% to 80% in a wavelength range of 490 to 700 nm.

In the above-mentioned third embodiment, although the visible light absorbing material is mingled in the surface layer 65a which is nearest to the viewer and which contains a large content of the light dispersing material, it goes without saying that the visible light absorbing material can be mingled in the base layer 65b which contains the small content of the light dispersing material so as to attain a similar improvement.

Fourth Embodiment

Figures 15A, 15B:
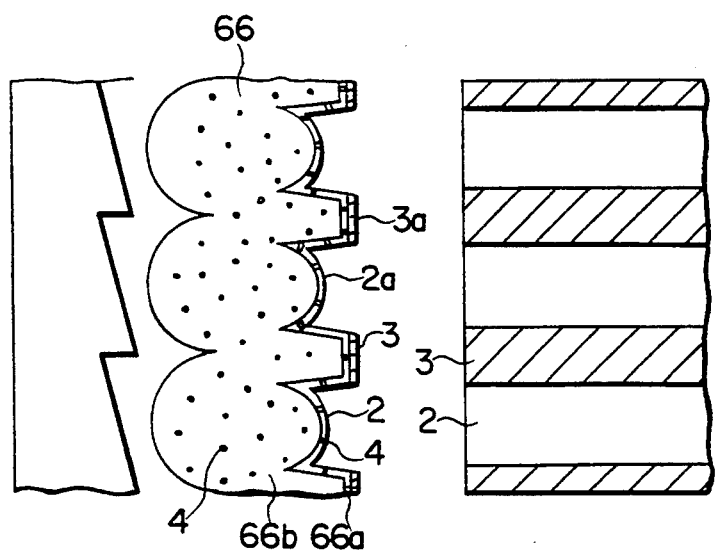
Figure 15C:
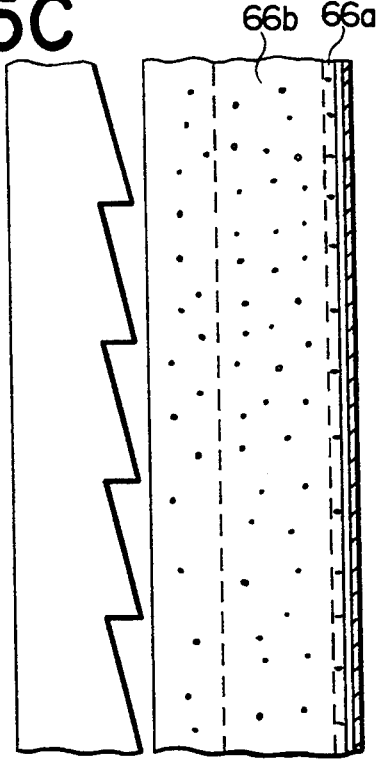

In the fourth embodiment, the content rates of the light dispersing material in the surface layer and the base layer are reversed to those in the third embodiment. Referring to FIGS. 15A to 15C, a lenticular lens sheet 66 is composed of two layers, that is, a surface layer 66a which is nearest to the viewer and which contains a small content of the light dispersing material and a base layer 66b on the rear side of the surface layer 66a, which contains a large content of the light dispersing material. Further, the outer surface layer 66a which is nearest to the viewer and which contains the small content of the light dispersing material is mingled therein with the visible light absorbing material. Accordingly, the visible light absorbing material absorbs external light so as to enhance the contrast with respect to the external light.

Fifth Embodiment

Next, explanation will be made of a fifth embodiment of the present invention with reference to FIGS. 2, and 4 to 7.

In the first to fourth embodiments, the external light contrast can be enhanced, but the brightness is largely lowered. In this fifth embodiment, the wavelength absorptivity in the visible light range is made to be selective in order to restrain the brightness from lowering.

This embodiment has such a feature that a visible light absorbing material having a selective wavelength characteristic by which the absorptivities with respect to red and green light are high but the absorptivity with respect to blue light is low, is mingled. As shown in FIG. 2, with respect to the absorptivity of the conventional transmission screen which is 100, a selective wavelength absorbing material having an absorptivity which is low (about 17% around 450 nm) in a wavelength range less than 490 nm within the visible wavelength range (that is, 400 to 700 nm), and which is high (about 40 to 45% in a range from 520 to 660 nm) in a wavelength range from 400 to 700 nm is mingled, as the light absorbing material, in the surface layer 1a which is nearest to the viewer and which does not contain the visible light dispersing material, and accordingly, 30% of absorptivity which is substantially equal to that in the first embodiment can be obtained, on a whole average.

In the case of a projection type television receiver using blue, green and red color cathode ray tubes (which will be hereinbelow denoted simply as "CRTs"), in general, the CRTs exhibit light emitting spectra as shown in FIG. 2 at a color fluorescent surface formed on the display panel section, that is, the blue color CRT gives a light emitting spectrum as indicated by 11 having a main peak around a wavelength of 450 nm, the green color CRT gives a light emitting spectrum as indicated by 12 and having a main peak around a wavelength of 550 nm, and the red color CRT gives a light emitting spectrum as indicated by 13 and having a peak around a wavelength of 610 nm.

The selective wavelength absorptivity 10 in this fifth embodiment is approximated to 30% of absorptivity which is equal to the uniform absorptivity in the first embodiment, as shown in FIG. 2. This fact will be explained by way of comparison. In the case of setting a white color at a certain color temperature (for example, 9,000 deg.K), the brightness ratios of red, green and blue as indicated by 14, 15, 16 in FIG. 4 are required for a conventional transmission type screen although certain difference in adjustment is present in dependence upon a kind of a projection type television receiver to be used. Further, since the brightness ratios on the screen surface are equal to those on the CRT surfaces, they can be derived from the relationships between the CRT beam currents which are measured under a predetermined condition shown in FIG. 5, and the brightness on the CRT surfaces, and accordingly, the maximum brightness can be obtained when the maximum rated currents of the CRTs are identical together, that is, when the beam current running through the blue CRT reaches a maximum rated value. Thus, with the use of this value as a reference, the red and green beam currents are adjusted so as to set a white color at a certain color temperature (for example, 9,000 deg.K), and accordingly, the current ratios of red, green and blue colors as indicated by 20 in FIG. 6 are obtained (although difference in adjustment is present in dependence upon a kind of a projection type television receiver to be used). The reason why the color ratio of the blue color CRT is large, is that the efficiency of light emission on the blue color CRT surface as indicated by 19 in FIG. 5 is lower than those on the green and red color CRT surfaces as indicated by 17, 18.

If the light absorbing material having a uniform absorptivity with respect to light in a visible light range as exhibited by the wavelength characteristic 9 shown in FIG. 2, is used, the current ratios are given by 21 in FIG. 6 when a white color at the same color temperature (for example, 9,000 deg.K) is set. That is, the current ratios are substantially equal to those of the conventional transmission type screen. The brightness ratios of red, green and blue at the screen are given by 15 shown in FIG. 4, that is, the brightness are lowered by degrees corresponding to the visible light absorptivity of the screen.

As a wavelength characteristic 10 shown in FIG. 2, in such a case that the absorptivity in the wavelength range of the light emitting spectrum 11 of the blue color CRT is low, but the absorptivities in the wavelength ranges of the light emitting spectrums 12, 13 of the red and green color CRTs are high, if beam currents having the same power allocation as that of the conventional one are fed to the blue, green and red color CRTs, the blue color is intensified at the color temperature which is higher than 9,000 deg.K since the absorptivities of green and red colors are high but the absorptivity of blue color is low. Accordingly, in order to make adjustment for the white color at the color temperature of 9,000 deg.K as in the conventional one, the maximum rated current running through the blue color CRT is not changed so that the powers for beam currents running through the green and red color CRTs should be increased by degrees corresponding to values by which the absorptivities of the green and red colors are higher than the absorptivity of the blue color. As a result, the beam current ratios of the CRTs are given by 22 in FIG. 6. That is, in comparison with the beam ratios given by 20 and 21, the beam current ratios of the green and red color CRTs become higher but the beam current ratio of the blue color CRT becomes lower.

Thus, by increasing the beam current ratios of the green and red color CRTs, the brightness ratios become substantially equal to those of the red, green and blue colors in the conventional arrangement, as indicated by 16 in FIG. 4. However, since the brightness ratios of the green and red colors having high light emitting efficiencies become higher, the lowering of the brightness of the total whiteness with the use of the selective wavelength absorbing material is less than that with the use of a material having an uniform absorptivity. Further, since the external light contrast ratio varies largely, depending upon an intensity of the external light and a surrounding atmosphere, the results of measurements which were made at an illumination intensity of 200 Lux at the screen surface under the same atmosphere are given in Table 1. The external light contrast ratio (5C) of the fifth embodiment of the present invention is improved by 30%, as understood from Table 1, similar to the external contrast ratio (1C) of the first embodiment which contains the visible light absorbing material 9 having a uniform light absorptivity, in comparison with the external contrast ratio (48C) of the conventional one which does not contain the visible light absorbing material. Further, the brightness becomes higher than that of the first embodiment by 11% but is lower than that of the conventional one by 19%. Thus, through various studies of the absorptivities of the blue, green and red colors, a screen having an optimum contrast ratio and brightness suitable for a projection type television receiver to be used can be selected.

The above-mentioned fifth embodiment is one of examples. The selective wavelength is controlled variously in such a condition that the absorptivity blue color light emitting spectrum range (less than 490 nm) is less than 50% while the absorptivity in the green and red color spectrum range (490 to 700 nm) is in a range of 30 to 80%, so as to obtain a desired contrast ratio and brightness. As another wavelength selecting method, the adjustment can be made in dependence upon the blue color light emitting spectrum range, the green color light emitting spectrum range and the red color light emitting spectrum range, as understood from characteristics 23, 24 shown in FIG. 7. In this case, it is required that selection is made in a range of less than 50% for the absorptivity in the blue color light emitting spectrum range (490 nm), in a range of 30 to 80% for the absorptivity of the green color light emitting spectrum range (490 to 580 nm) and in a range of 30 to 80% for the absorptivity in the red color light emitting spectrum range (580 to 700 nm), and it is also required that the absorptivity in the blue color light spectrum range is lower than those in the green and red color light emitting spectrum ranges.

Sixth Embodiment

Explanation will be hereinbelow made of a sixth embodiment of the present invention with reference to FIGS. 11A to 11C and FIGS. 8 to 10.

Figures 11A, 11B:
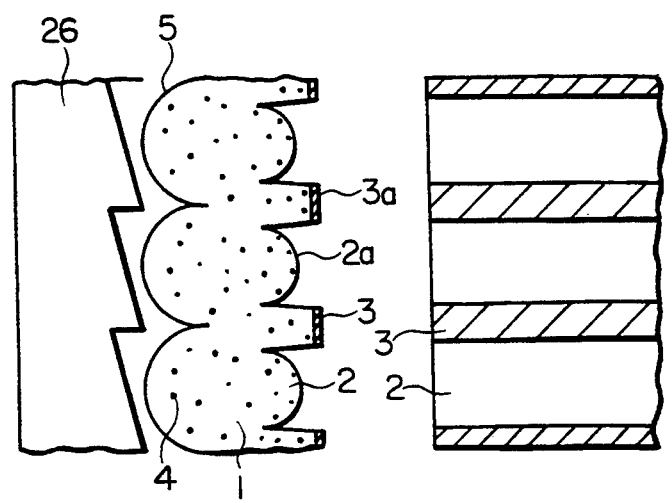
Figure 11C:
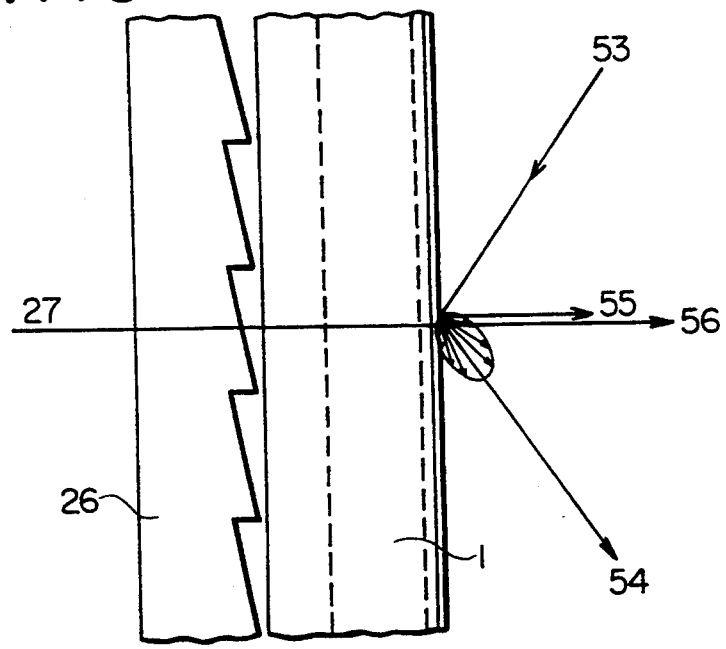

Referring to FIGS. 11A to 11C, a lenticular lens sheet 1 is formed at the incidence side one of its principal planes with lenticular lenses 5 and at the emission side one thereof with lenticular lenses 2 that are located in parts to which light is converged by the incident side lenticular lenses 5, and with black stripes 3 with equal pitches, that are located in parts where no light is converged by the incident side lenticular lenses 5. Further, the lenticular lens sheet 1 located on the emission side is composed of two layers, that is, a surface layer 1a which is nearest to the viewer and which does not contain a light dispersing material, and a base layer 1b which contains the light dispersing material 4. Further, the surface layer 1a which is nearest to the viewer and which does not contain the light dispersing material 4 is formed at its outer surface with mirror-surfaces 2a, 3a having a luster thereon, which prevent occurrence of irregular reflection of external light.

Figure 25A:
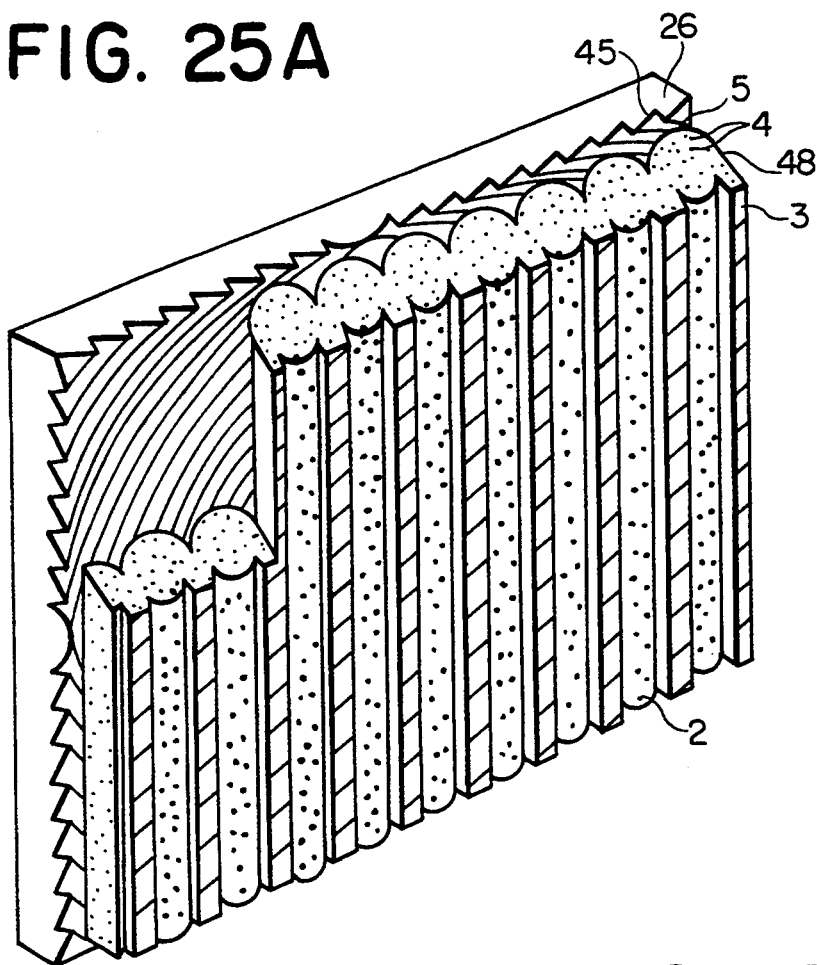
Figure 25B:
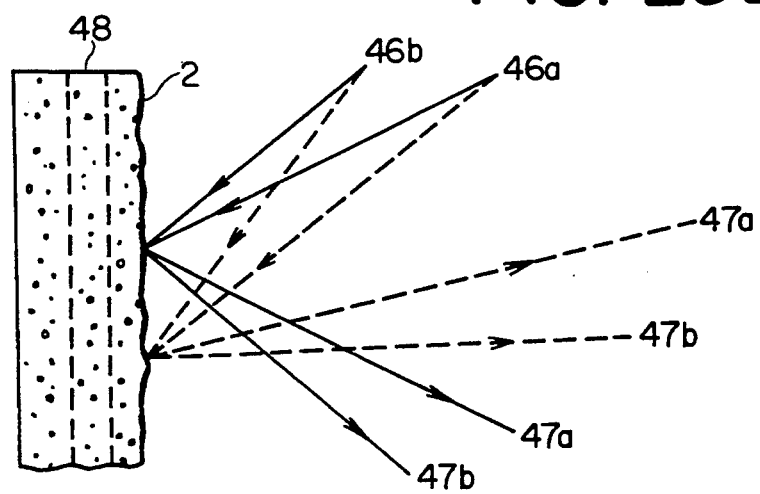

The reflection includes normal reflection and irregular reflection. In the case of reflection on a mirror-surface, normal reflection mainly occurs, but in the case of reflection on a surface which are formed thereon with fine convexities and concavities, irregular reflection mainly occurs. The lenticular lens 1 having the emission side surface which is mirror-like, mainly causes normal reflection, that is, the incidence angle of light is equal to the reflection angle. In the case of incidence light rays 6a, 6b as shown in FIG. 1C, reflection light rays 7a, 7b, 7a", 7b" are obtained. On the contrary, the reflection surface which are formed thereon with fine concavities and convexities as shown in FIG. 25B, causes irregular reflection. That is, the incidence angle of light incident upon the reflection surface differs in dependence upon the shape of the surface, and reflection occurs at a reflection angle having a value equal to that incidence angle. Accordingly, the incidence angle of external light rays 46a, 46b are turned into reflection light rays 47a, 47b which enter into a suitable viewing angle range, causing the contrast to be lowered.

Next explanation will be qualitatively made of the reason why a difference occurs in the contrast in the case of a projection type television receiver which is set in a room.

The projection type television receiver is in general set as shown in FIG. 8, and in this case, the practical viewing angle range 25 is defined between the floor on which the viewer lies and the height of the viewer who stands on the floor, at a position distant from the screen of the television receiver by 2 m. In this case, light from lamps 28, 29, 30 at the ceiling cause normal reflection, if the screen surface is mirror-like, so that the light comes to positions 32, 33, 34, 35 on the floor. That is, only irregular reflection enters into the practical viewing angle range 25. Since the height H of the center of the screen 37 of the projection type television screen is usually about 1 m, normal reflection entering into the practical viewing angle range 25 occurs when external light has an incidence angle $\theta$ which is about 26.5 deg. that is obtained from Equation (1) as follows, estimating that the distance between the screen of the television and the viewer is 2 m:

$$\tan\theta = \frac{L}{H} \quad (1)$$

where L is distance between the screen and the viewer and H is the height of the center of the screen.

Since the incidence angle is equal to the reflection angle, the viewer feels lowering of the contrast at an incidence angle of about 26.5 deg. only when he watches the television lying on the floor. However, no reflection of the external light reaches the viewer if he watches the television with a sitting or standing posture, and accordingly, he does not feel lowering of the contrast. In general, the incidence angle of light from a lamp at the ceiling, a fluorescent lamp or an incandescent lamp suspended from the ceiling as a light source can hardly be below 26.5 deg., excepting extraordinary cases.

Further, external light entering from the outdoor through a window, for lighting, includes not only parallel light but largely includes oblique light as dares to say, and accordingly, no problem occurs unless sunlight is directly incident upon the screen surface of the television receiver set by the window. The external light is irregular so that it is incident upon the screen surface at various angles, depending upon a position of the light source.

Next, the light dispersion characteristics and contrast data of the conventional lenticular sheet having a surface formed thereon with concavities and convexities, and the lens sheet having a mirror surface according to the present invention will be given, and further explanation thereto will be made.

FIG. 9 is a plan view for explaining the way of measurement for reflection light. As shown in FIG. 9, within a dark room, light was projected from a projector as a light source through a pin hole having a bore diameter of 5 mm, and accordingly, a light beam 42 having an incidence angle at a screen 38 lined with a black sheet 39, which was slightly larger than a photometric angle 44 of a brightness meter was directed to the screen 43. By successively changing the incidence angle, normal reflection and irregular reflection were measured with the use of the brightness meter 43, and the results of the measurement are shown in FIG. 10. However, the measurement at an incidence angle of zero could not be made since the light source and the brightness meter were aligned with each other. Accordingly, the incident light at an angle of 3 deg. was measured.

FIG. 10 shows three kinds of relationships between the finished conditions of the emission side surfaces of screens and reflection light, which are plotted at every incidence angle. As a result, the incident light at an angle of 3 deg. gives reflection indicated by c and d to the viewer with the light source at an angle of 3 deg as shown in FIG. 10. The light c having a high brightness reaches the viewer watching the projection type television receiver if the mirror surface which gives largely normal reflection exhibits a curve 51. However, if the surface giving curve 49 is not mirror-like but has convexities and concavities, although an angle is near to that of normal reflection, the incident light is dispersed by convexities and concavities so that reflection becomes substantially irregular, and accordingly, reflection d having a low brightness reaches the viewer.

Further, no reflection having such an incidence angle occurs actually, or it is extremely slight although it is present. In the case of incident light having an incidence angle of larger than 15 deg., reflection reaching the viewer watching the projection type television receiver affects the contrast. Accordingly, in an incidence angle range of 15 to 60 deg., concerning the intensity of the reflection by the incident light, the reflection brightness of the above-mentioned incident light at an angle of 3 deg. is reversed, and accordingly, the reflection brightness of reflection rays f, h, j, l at the mirror surface giving the curve 51 is lower than that of reflection rays e, g, i, k at the surface formed thereon with slight concavities and convexities and giving the curve 49. Thus, the external contrast can be improved accordingly.

Next, explanation will be made of effects by improvements in contrast, according to the present invention.

As shown in FIG. 11C, light 27 projected from a CRT is transmitted through a screen composed of a Fresnel lens sheet 26 and a lenticular lens sheet 1, and is therefore turned into a transmitted light 56 having a white light intensity W and a black light intensity B. Incident light 53 given by external light is reflected by the outer surfaces 2a and 3a of lenticular lenses 2 and black stripes 3, and the thus obtained reflected light $\Delta x$ has normal reflection 54 whose intensity is highest and irregular reflection 55 whose intensity is low.

The contrast ratio C(n) is given by Equation (2), and further, since the white light intensity W is higher than the black light intensity B, the relationship given by Expression 3 can be obtained.

$$C(n) = \frac{W}{B} \quad (2)$$

$$W > B \quad (3)$$

The contrast ratio C(g) with respect to the external light is given by Equation (4):

$$C(g) = \frac{W + \Delta x}{B + \Delta x} \quad (4)$$

Concerning the external light contrast ratio at a certain position (for example, at a position 56 on the screen front surface shown in FIG. 11C) in the practical viewing angle range, in the case of the emission side surface of the lenticular lens sheet according to the present invention, which is mirror-like, the reflection $\Delta x$ is exhibited by a curve (c, f, h, j, i) 51 shown in FIG. 10, which is given by an entirely mirror surface, but in the case of a surface having concavities and convexities, the reflection $\Delta x$ is exhibited by a curve (d, e, g, i, k) 49 as shown in FIG. 10, which is given by a concave and convex surface. The relationships given Expressions (5) and (6) are obtained.

$$\Delta x(c) > \Delta x(D) \quad (5)$$

$$\Delta X(f,h,j,l) < \Delta x(e,g,i,k) \quad (6)$$

Accordingly, from the relationship between the expressions (3) and (4), the external light contrast ratios become $C(\gamma) < C(\delta)$ where $C(\gamma)$ is contrast ratio obtained by the screen according to the present invention, and $C(\delta)$ is contrast ratio obtained by the conventional screen, if the relationship is given by Expression (5), but they become $C(\gamma) > C(\delta)$ if the relationship is given by Expression (6). In comparison between the screen according to the present invention and the conventional one, since the cross point 52 at which the relationship in intensity of reflection light is reversed is less than an incidence angle of 15 deg., and further since the practical viewing angle range 25 is below an 26.5 deg. as calculated by Equation (1) in such a case that the viewer watches the projection type television receiver 36, no strong reflection can reach the viewer, substantially, and further, no reflection $\Delta x(c)$, $\Delta x(d)$ at an angle of 3 deg. as given by Expression (5) reaches the viewer, substantially. The reflection given by Expression (6) is mainly obtained.

Accordingly, in the case of the lenticular lens sheet having the emission side surface which is mirror-like, according to the present invention, the reflection does not reach the viewer, substantially, and therefore, it has been proved that the contrast with respect to external reflection can be improved. Further, measurement to the contrast ratio with respect to external light was made actually when light from the ceiling, as external light, was incident upon the screen, as shown in FIG. 8, and the results of measurement is given in Table 2. As understood from Table 2, the screen having a surface which is entirely mirror-like, according to the present invention exhibits a contrast ratio Cd of 1:14.8 while the conventional one having a surface which is formed thereon with concavities and convexities exhibits a contrast ratio Ca of 1:12.29 with a black window pattern of 1% when the illumination intensity in a plane perpendicular to the screen is 500 Lux even although the contrast ratios thereof in a dark room are identical with each other. That is, the contrast ratio in the case of the entire mirror-surface can be improved by 12%.

Further, if a glass pane or a plastic mirror surface plate is laid in front of the surface of the screen, an image thereon cannot be observed clearly since the screen surface reflects therein an object (a fluorescent to be, a lamp, a window, a curtain, a furniture a person or the like) around the screen although the contrast can be improved. On the contrary, with the lenticular lens sheet 1 having the emission side surface which is mirror-like according to the present invention, the reflection therein is diverged horizontally by the lenticular lens, and accordingly, the shape of the reflection therein becomes horizontally longer. Further, the reflection is slitted by the black stripes so that the reflection therein is not continuous. Thereby, it is possible to provide a high quality image having a higher contrast, a high resolution and less reflection therein.

improved by the outer surfaces 3a of the black stripes 3. As explained in the sixth embodiment, the contrast ratio C(n) can be given by Expression (2) so that the relationship given by Expression (3) can be obtained. The contrast ratio C(g) with respect to external light can be given by Expression (4). As to the contrast ratio with respect to external light at a certain position (for example, at a position in front of the screen, as indicated by 56 in FIG. 12C), the reflection light $\Delta x$ is obtained by the superposition of the reflection light 59 having a relatively high intensity and the reflection light 55 having a relatively low intensity in the case of the lenticular lens having the emission side surface on which the outer surfaces 3a of the black stripes are mirror-like, according to the present invention. Accordingly, as shown in FIG. 10, the reflection is given as $\Delta x$ (m, n, o, p, q)

TABLE 2

| | CONVENTIONAL CONCAVE & CONVEX SCREEN | #6 EM. (MIRROR SURFACE) | CONTAINING 30% LIGHT ABSORBING MATERIAL | | |
|---|---|---|---|---|---|
| | | | #1 EM | COMBI. #1 & #7 | COMBI. #1 & #6 |
| D BLACK (B) | 7 nit | 4.46 | 4.47 | 4.46 | 4.46 |
| WHITE (W) | 159 nit | 159 | 180 | 160 | 160 |
| CONTRAST RATIO (W/B) | 1:35.6 | 1:35.7 | 1:35.8 | 1:35.9 | 1:35.9 |
| E REFLECTION ($\Delta X$) AT SCREEN | 7.91 nit | 7.12 | 5.53 | 5.34 | 4.98 |
| BLACK (B + $\Delta X$) | 13.0 nit | 11.7 | 10.6 | 10.1 | 9.44 |
| WHITE (W + $\Delta X$) | 168 nit | 168 | 169 | 170 | 169 |
| EXTERNAL LIGHT | Ca | Cb | Cc | Cd | Ce |
| CONTRAST RATIO (W + $\Delta X$)/(B + $\Delta X$) | 1:12.9 | 1:14.5 | 1:16.0 | 1:16.7 | 1:17.9 |
| IMPROVED EFFECT IN CONTRAST IN COMPARISON TO CONVENTIONAL CONCAVE & CONVEX SCREEN | × 1 | × 1.12 +12% | × 1.24 +24% | × 1.29 +29% | × 1.39 +39% |

NOTE:
External light is oblique light from ceiling, and is measured with illumination intensity of 500 Lux at center of screen surface.
D: Dark Room
E: External Light Seventh Embodiment Next explanation will be made of a seventh embodiment of the present invention with reference to FIG. 10 and FIG. 12.

In the seventh embodiment, the outer surfaces 3a of the black stripes 3 at the emission side surface of the lenticular lens 1 are made to be mirror-like.

Figure 12A:
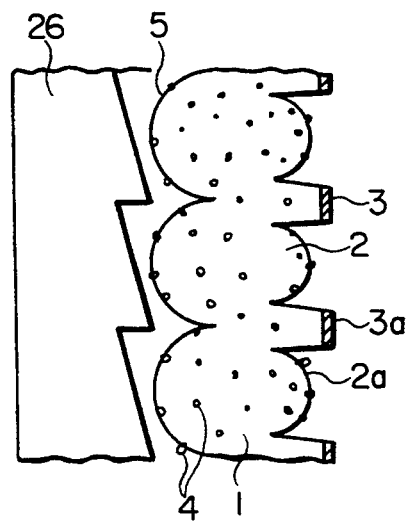
Figure 12B:
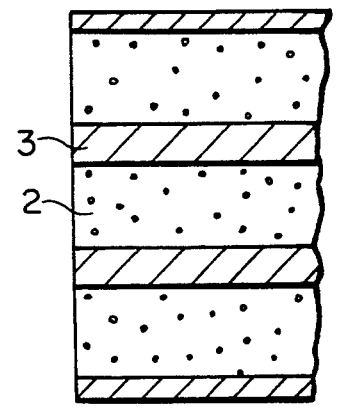
Figure 12C:
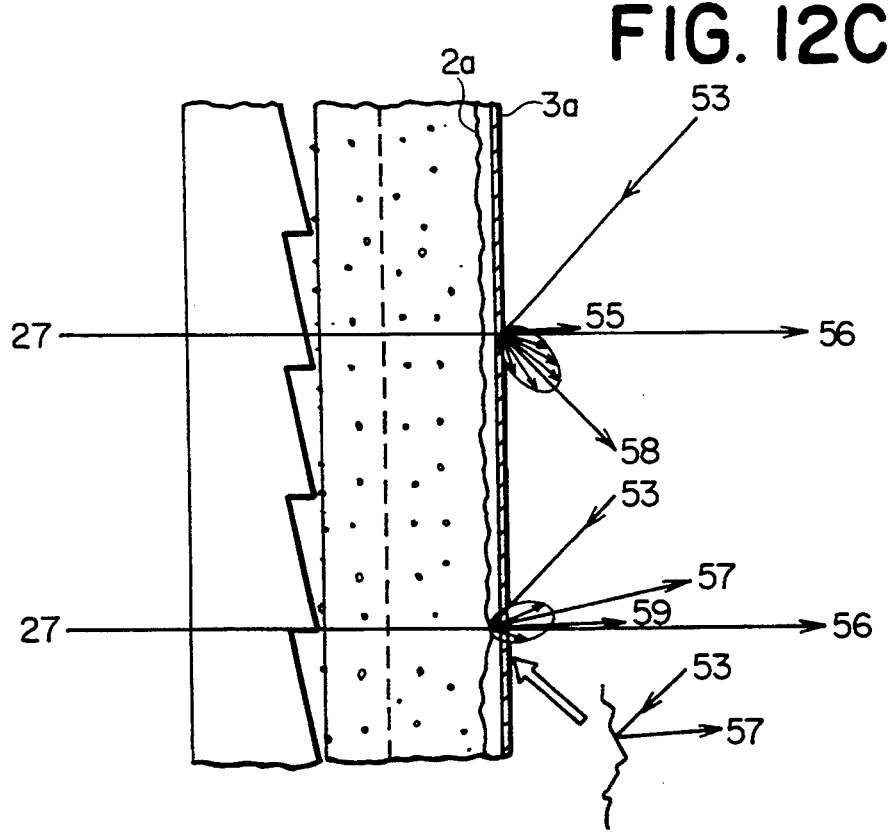

With this arrangement, as shown in FIGS. 12A to 12C, the outer surfaces 2a of the lenticular lenses 2 on the emission side surface of the lenticular lens sheet 1 are formed thereon with fine concavities and convexities. Accordingly, incident light 53 given by external light is turned into reflection 57 with a different reflection angle caused by the concavities and convexities on the surfaces 2a of the lenticular lenses 2, and accordingly, reflection light rays 57, 59 having a relatively strong intensity reach the viewer. However, the incident light 53 mainly causes normal reflection, that is, the reflection is made at an angle equal to the incidence angle of the incident light, at the outer surfaces 3a of the black stripes 3, and accordingly, the incident light 53 is turned into a reflection light ray 58. Accordingly, in the seventh embodiment, irregular reflection light rays 55 having a low intensity reaches the viewer. As mentioned above, the contrast cannot be improved by the outer surfaces 2a of the lenticular lenses 2, but can be exhibited by a curve 50 and caused by the black stripes having mirror-like outer surfaces. Meanwhile, in the conventional one having the emission side surface formed thereon with concavities and convexities, the reflection is given as $\Delta x$ (d, e, g, i, k) exhibited by a curve 51. Accordingly, the relationships given by Expressions (7) and (8) can be obtained.

$$\Delta x(d) > \Delta x(m) \qquad (7)$$

$$\Delta x(e, g, i, k) < \Delta x(n, o, p, q) \qquad (8)$$

As mentioned above, since the cross point 52 at which the intensity of the reflection is reversed between the seventh embodiment of the present invention and the conventional one is less than an incidence angle of 15 deg., and since the practical viewing angle range 25 is less than 26.5 deg. in such a case that the viewer watches the projection type television receiver 36, substantially no reflection having a high intensity can reach the viewer. The reflection $\Delta x(d)$, $\Delta x(m)$ at an angle of 3 deg. as given by Expression (7) cannot substantially reach the viewer. The reflection reaching the viewer is mainly given by Expression (8).

Accordingly, with the arrangement of the seventh embodiment of the present invention in which the outer surfaces 3a of the black stripes are mirror-like, substantially no reflection can reach the viewer, as is with the arrangement of the sixth embodiment, thereby it has been proved that the contrast ratio with respect to the external light can be improved. Further, as shown in FIG. 10, the curve 51 given by the surface which is entirely mirror-like is Δx(c, f, h, i, j, l), and accordingly, the seventh embodiment cannot compete with the sixth embodiment in which the entire surface of the lenticular lens sheet is mirror-like.

The seventh embodiment in which the black stripes are made to be mirror-like on the emission side surface of the lenticular lens does not cause reflection therein since the lenticular lenses are formed therein with concavities and convexities, and further, reflection in the outer surfaces of the black stripes is reduced by the slits among the black stripes. Accordingly, this arrangement not only exhibits a higher contrast than that of the conventional one, but also causes less reflection therein than that of the other arrangement in which the entire emission side surface of the lenticular lens is made to be mirror-like, thereby it is possible to provide an image having a high quality and a high resolution.

In order to form mirror-surfaces on the black stripes 3 at the emission side surface of the lenticular lens sheet 1, the following measures may be taken. That is, carbon having a black color which is as black as possible is selected in order to prepare a material for printing the black stripes without the light dispersing material being contained, and accordingly, a printing material for the black stripes is prepared. Further, a layer which is nearest to the viewer and which does not contain the light dispersing particles is formed, and with the use of the above-mentioned printing material, printing is made to the projected stripe surfaces by a screen printing process, a roll printing or another printing process so as to form black stripes on the lenticular lens sheet.

Further, a lustrous black color material is printed on a transfer film from which the black color material is transferred onto projected stripe surfaces on the lenticular lens sheet by a hot stamp, a heating roller or the like so as to form the black stripes having mirror-surfaces, on the emission side surface of the lenticular lens sheet according to the present invention. It goes without saying that this process can also achieve the purpose of enhancing the contrast.

Eighth Embodiment

Next, explanation will be made of an eighth embodiment of the present invention. This embodiment concerns the combination of the first to seventh embodiments of the present invention so as to improve the contrast. Ten kinds of combinations can be considered such as the first and sixth embodiments, the first and seventh embodiments, the second and sixth embodiments, the second and seventh embodiments, the third and sixth embodiments, the third and seventh embodiments, the fourth and sixth embodiments, the fourth and seventh embodiment, the fifth and sixth embodiments, and the fifth and seventh embodiments. Of these various combinations, two kinds of combinations, that is, the combinations of the first and sixth embodiments, and the first and seventh embodiments will be explained.

The result of measurements of the contrasts of these two kinds of combinations are shown in Table 2 from which it is understood that the contrast ratios in the dark room are within a range of 1:35.6 to 1:35.9. That is, the same result can be obtained.

In the case of external light having 500 Lux at the front of the screen (which is oblique light emitted from the ceiling), the external light contrast ratio Ca is 1:12.9, and accordingly, with the use of this ratio as a reference, the improved effect according to the present invention will be explained.

At first, the first embodiment alone offers an external light contrast ratio Cc of 1:16.0 with an improved effect of +24%, and the sixth embodiment alone offers an external light contrast ratio Cb of 1:14.5 with an improved effect of +12%. Then, the combination of the first and sixth embodiments offers an external light contrast ratio Ce of 1:17.9 with an improved effect of +39%. Next, the combination of the first and seventh embodiments offers an external light contrast ratio Cd of 1:16.7 with an improved effect of +29%. Accordingly, it has been proved that the contrast ratio with respect to the external light can be improved in comparison with that of the sole one of the first to seventh embodiment. Further, the reason why the sixth embodiment alone offers an improved effect which is larger than that offered by the combination of the sixth and seventh embodiments has been already explained in the seventh embodiment.

Further, in order to enhance the improved effect while the lowering of the brightness is restrained as far as possible, it is important to consider the combination of the absorption of the visible light absorbing material and the mirror-surface condition of the surface of the screen on the viewer side.

Explanation will be made of an embodiment of a method of producing the screens in the above-mentioned first to eighth embodiments, according to the present invention, with reference to FIG. 13.

A lenticular lens sheet base material 61 extruded from an extruder 60 of an extrusion molding machine is led through an incidence side forming roll 62 for forming the incidence side lenticular lens surface and an emission side forming roll 63 for forming the emission side lenticular surface so as to form the lenticular lens sheet 1. At this time, a transparent resin sheet 64 which is compatible with the lenticular lens sheet base material 61 is fed to the emission side forming roll 63 for forming the emission side lenticular lenses and the black stripe surfaces so as to form the surface layer 1a which does not contain the light dispersing material on the surface which is nearest to the viewer. In this embodiment, by using a compatible transparent resin sheet in which the visible light absorbing material is mingled, together with a lenticular lens sheet in which the light dispersing material is mingled, the transmission type screen in the first embodiment can be obtained. Further, by using a compatible transparent resin sheet in which the light dispersing material and the visible light absorbing material are mingled, together with a transparent resin lenticular lens sheet base material, the transmission type screen in the second embodiment can be obtained. Naturally, the light dispersing material and the visible light absorbing material can be mingled in the lenticular lens sheet base material 61, or the visible light absorbing material can be mingled into the light dispersing material. Further, if lenticular lens forming surfaces 2a-a and black stripe forming surfaces 3a-a on the emission side forming roll 63 are made to be mirror-like, the screen in the sixth embodiment can be obtained.

By using a compatible transparent resin sheet in which a large quantity of the light dispersing material is mingled and in which the visible light absorbing material is also mingled, together with a lenticular lens sheet base material in which a small quantity of the light dispersing material is mingled, the transmission type screen in the third embodiment can be formed. Further, by using a compatible transparent resin sheet in which a small quantity of the light dispersing material is mingled and in which the visible light absorbing material is also mingled, together with a lenticular lens sheet base material in which a large quantity of the light dispersing material is mingled, the transmission type screen in the fourth embodiment can be obtained.

Next, explanation will be made of an embodiment of another method of forming the surface layer 1a which is nearest to the viewer and which does not contain the light dispersing material. The lenticular lens sheet base material is extruded from the extrusion molding machine so as to produce the lenticular lens sheet 1 formed on the incidence side thereof with the lenticular lenses 5 and on the emission side thereof with the lenticular lenses 2 and the black stripes 3. Then, metal or metal oxide such as $MgF_2$, $SiO_2$ is deposited on the outer surfaces of the lenticular lenses 2 and the black stripes 3 on the emission side surface of the lenticular lens sheet 1 by evaporation, sputtering or the like so as to form thin films thereof, thereby it is possible to obtain mirror-surfaces which can improve the transmissivity with less reflection.

The above-mentioned method is effective for the sixth embodiment. Further, if the visible light absorbing material is mingled in the lenticular lens sheet, it can be used for the eighth embodiment. Naturally, a transparent material can be formed by coating, dipping, printing, painting or the like.

Further, there may be used a method in which a film is coated or printed thereover with a transparent material, and then the transparent material is transferred from the film by a hot stamp, a roll or the like for forming a thin film, a method in which a supply sheet is coated or printed thereover with a transparent material with the use of a manufacturing method used for a ninth embodiment, and thereafter, the sheet alone is peeled off therefrom, and so forth. If no visible light absorbing material is mingled in the above-mentioned transparent sheet, the screens in the sixth and seventh embodiment can be manufactured. If the visible light absorbing material is mingled therein, the screens in the first to fifth and eighth embodiment can be formed.

Ninth Embodiment

Next, explanation will be made of a ninth embodiment with reference to FIGS. 16A to 16C.

Figure 16A:
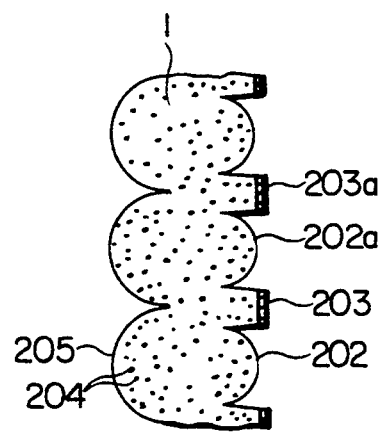
Figure 16B:
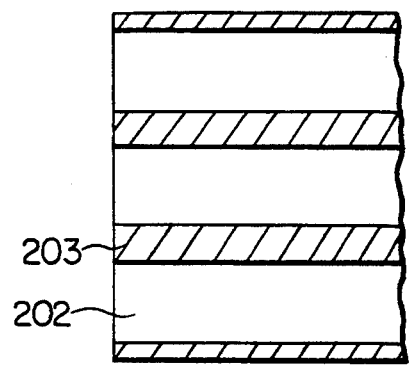
Figure 16C:
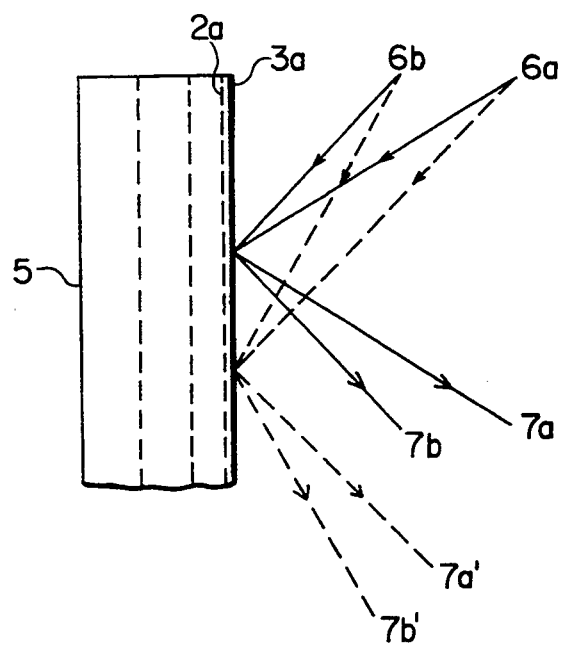

Referring to FIGS. 16A to 16C, a lenticular lens sheet 201 is at first formed at its principal planes with emission side and incidence side lenticular lenses 202 and at the emission side one thereof with lenticular lenses 205. Then, black stripes 3 are formed at equal pitches in parts where no light is converged by the incident side lenticular lenses 205. Further, the outer surfaces of the emission side lenticular lenses 202 and the black strips 203 are formed as lustrous mirror surfaces 202a, 203a which prevent occurrence of irregular reflection of external light.

Tenth Embodiment

Next explanation will be made of a tenth embodiment of the present invention with reference to FIGS. 17A to 17B. In this embodiment, the outer surfaces 203a of black stripes 203 on the emission side surface of a lenticular lens sheet 201 are made to be mirror-like.

In this arrangement, as shown in FIGS. 17A to 17B, the outer surfaces 202a of the lenticular lenses 202 on the emission side surface of the lenticular lens sheet 201 are formed thereon with fine concavities and convexities. Accordingly, incident light given by external light 236 is turned into reflection 237 with a different reflection angle caused by the concavities and convexities on the surfaces 202a of the lenticular lenses 2, and accordingly, reflection light rays 237, 239 having a relatively strong intensity reach the viewer. Further, on the emission side of the lenticular lenses sheet, normal reflection is mainly caused at the outer surfaces 203a of the black stripes 203 which are mirror-surface-finished, and accordingly, the reflection is made at an angle equal to the incidence angle so that the incident light by the external light 236 is turned into a reflection light 238. Accordingly, irregular reflection light rays 240 having a low intensity reaches the viewer. As mention above, in this tenth embodiment, the contrast cannot be improved by the outer surfaces of the lenticular lenses, but can be improved by the black stripes.

As mentioned above, the tenth embodiment in which the black stripes are made to be mirror-like on the emission side surface of the lenticular lens does not cause reflection therein since the lenticular lenses are formed therein with concavities and convexities, and further, reflection in the outer surfaces of the black stripes is reduced by the slits among the black stripes. Accordingly, this arrangement not only exhibits a higher contrast than that of the conventional one, but also causes less reflection therein than that of the other arrangement in which the entire emission side surface of the lenticular lens is made to be mirror-like, thereby it is possible to provide an image having a high quality and a high resolution.

In order to form mirror-surfaces on the black stripes 203 at the emission side surface of the lenticular lens sheet 201, the following measures may be taken. That is, carbon having a black color which is as black as possible is selected in order to prepare a material for printing the black stripes without the light dispersing particles being contained, and accordingly, a printing material for the black stripes is prepared. With the use of this printing material, printing is made to the projected stripe surfaces on the lenticular lens sheet by a screen printing process, a roll printing or another printing process. Further, a lustrous black color material is printed on a transfer film from which the black color material is transferred onto projected stripe surfaces on the lenticular lens sheet by a hot stamp, a heating roller or the like so as to form the black stripes having mirror-surfaces, on the emission side surface of the lenticular lens sheet according to the present invention. It goes without saying that this process can also achieve the purpose of enhancing the contrast.

Eleventh Embodiment

Referring to FIGS. 18A and 18B which shows a transmission type screen in an eleventh embodiment of the present invention, the transmission type screen is a double sheet type in which a Fresnel lens sheet 108 is arranged on the light incident side upon which output light 150 from a cathode-ray tube is incident, and a lenticular lens sheet 101 is arranged on the light emission side (or viewer side).

The lenticular lens sheet 101 is formed at the incident side one of its principal planes with lenticular lenses 105 and at the emission side one thereof with lenticular lenses 102 that are located in parts to which light is converged by the incident side lenticular lenses 105, and with black stripes 103 with equal pitches, that are located in parts where no light is converged by the incident side lenticular lenses 105. Further, the lenticular lens sheet 101 located on the emission side is composed of three layers, that is, a surface layer 101a (which will be hereinbelow denoted as "first layer") which is nearest to the viewer and which contains a light dispersing material, an intermediate layer 101b (which will be hereinbelow denoted as "second layer") which contains the light dispersing material, and a transparent base layer 101c (which will be hereinbelow denoted as "third layer") which defines a rear surface and which does not contain either the visible light absorbing material or the light dispersing material. This visible light absorbing material in the first layer 101a absorbs external light so as to enhance the contrast with respect to the external light.

Although it has been explained in this embodiment that the lenticular lens sheet 101 are formed of three layers, that is, the first layer 101a which is nearest to the viewer and in which the visible light absorbing material is mingled, the second layer 101b in which the light dispersing material is mingled and the third layer 101c in which neither the visible light absorbing material nor the light dispersing material is mingled, the lenticular lens sheet according to the present invention should not be stuck to this arrangement, and accordingly, the visible light absorbing material can be mingled in the second layer 101b or the third layer 101c, or can be mingled in all of the first, second and third layers. Further, it can be mingled in the light dispersing material. It goes without saying that any of these case can offer an improved effect to the contrast.

Twelfth Embodiment

Figure 19A:
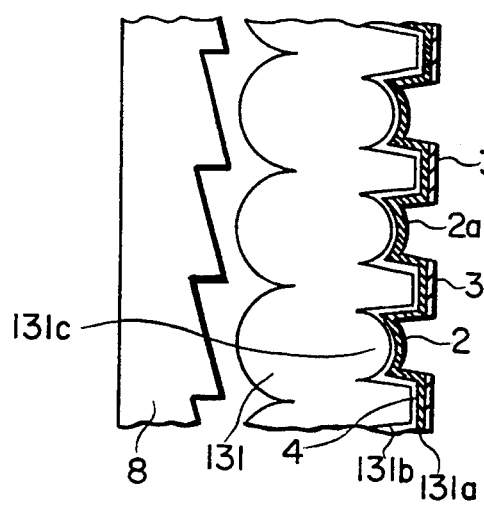
Figure 19B:
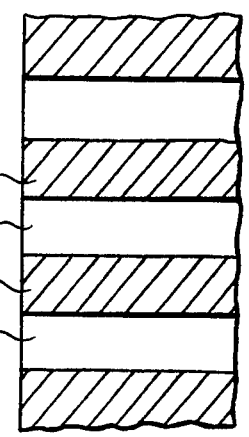
Figure 19C:
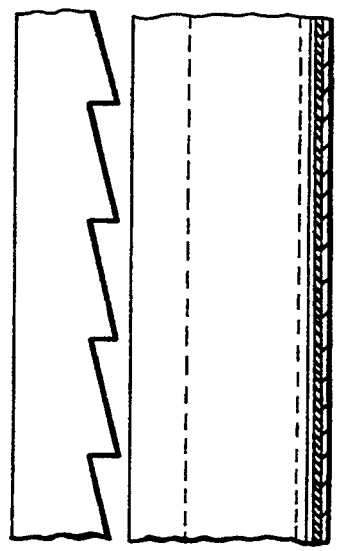

Next, explanation will be made of a twelfth embodiment of the present invention with reference to FIGS. 19A and 19B.

A lenticular lens sheet 131 is composed of a first layer 131a which contains the light dispersing material, a second layer 131b which contains the visible light absorbing material and a third transparent layer 131c which does not contain either the visible light absorbing material or the light dispersing material. In this case, the visible light absorbing material in the second layer 131b absorbs external light so as to enhance the contrast with respect to external light.

It goes without saying that the improved effect to the contrast with respect to external light becomes better than that of the conventional lenticular lens sheet which does not contain the visible light absorbing material, as already explained in the first embodiment. However, in comparison with the first embodiment, the improved effect becomes equal to or less than that of the first embodiment. In this twelfth embodiment, the visible light absorbing material is mingled in the second layer 131b as the intermediate layer. However, as another example, the visible light absorbing material can be mingled in the first layer 131a or the third layer 131c, or can be mingled into all of the first, second and third layers. Further, it can be mingled in the light dispersing material. It goes without saying that any of these case can similarly offer an improved effect to the contrast.

Thirteenth Embodiment

Figures 20A, 20B:
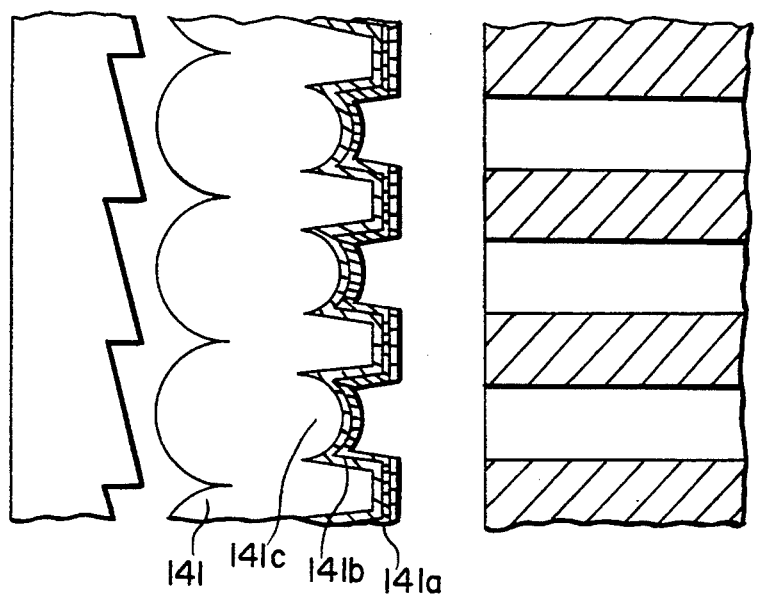

Next, explanation will be made of a thirteenth embodiment of the present invention with reference to FIGS. 20A and 20B.

A lenticular lens sheet 141 is composed of a first layer 141a which contains the visible light absorbing material and a small quantity of the light dispersing material, a second layer 141b which contains a large quantity of the visible light absorbing material and a third transparent layer 141c which does not contain either the visible light absorbing material or the light dispersing material. In this case, the visible light absorbing material in the first layer 141a absorbs external light so as to enhance the contrast with respect to external light. It goes without saying that the improved effect to the contrast with respect to external light becomes better than that of the conventional lenticular lens sheet which does not contain the visible light absorbing material, as already explained in the first embodiment. However, in comparison with the first embodiment, the improved effect becomes equal to that of the first embodiment. In this thirteenth embodiment, the visible light absorbing material is mingled in the first layer 141a as the surface layer. However, as another example, the visible light absorbing material can be mingled in the second layer 141a or the third layer 141c, or can be mingled into all of the first, second and third layers. Further, it can be mingled in the light dispersing material. It goes without saying that any of these case can similarly offer an improved effect to the contrast.

Fourteenth Embodiment

Figures 21A, 21B:
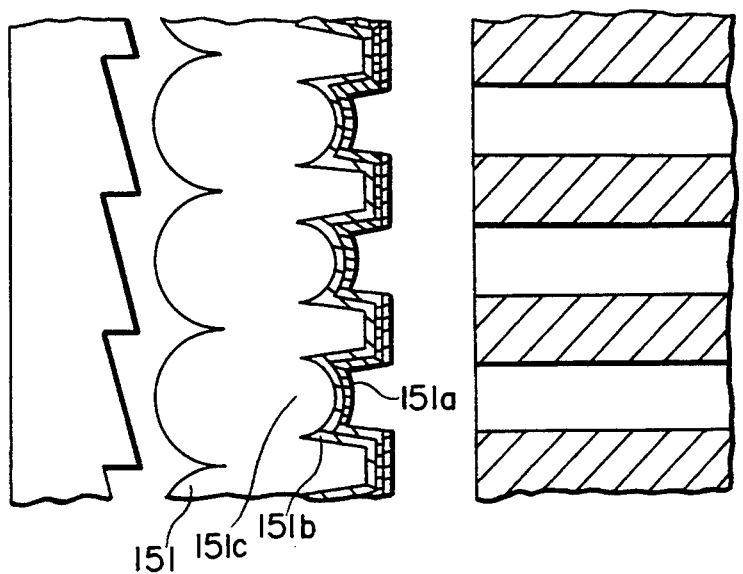

Next, explanation will be made of a fourteenth embodiment of the present invention with reference to FIGS. 21A and 21B.

A lenticular lens sheet 151 is composed of a first layer 151a which contains the visible light absorbing material and a large quantity of the light dispersing material, a second layer 151b which contains a small quantity of the light dispersing material and a third transparent layer 151 which does not contain either the visible light absorbing material or the light dispersing material. In this case, the visible light absorbing material in the first layer 151a absorbs external light so as to enhance the contrast with respect to external light. It goes without saying that the improved effect to the contrast with respect to external light becomes better than that of the conventional lenticular lens sheet 65 which does not contain the visible light absorbing material, as already explained in the first embodiment. However, in comparison with the first embodiment, the improved effect becomes equal to that of the first embodiment. In this fourteenth embodiment, the visible light absorbing material is mingled in the first layer 151a as the surface layer. However, as another example, the visible light absorbing material can be mingled in the second layer 151a or the third layer 151c, or can be mingled into all of the first, second and third layers. Further, it can be mingled in the light dispersing material. It goes without saying that any of these case can similarly offer and improved effect to the contrast.

Fifteenth Embodiment

Figures 22A, 22B:
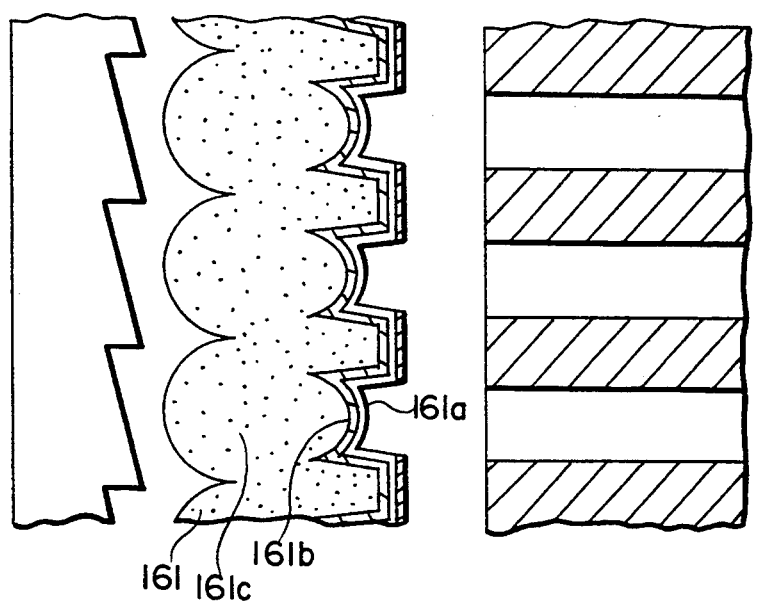

Next, explanation will be made of a fifteenth embodiment of the present invention with reference to FIGS. 22A and 22B.

A lenticular lens sheet 161 is composed of a first layer 161a which contains the visible light absorbing material but does not contain the dispersing material, a second layer 161b which contains a small quantity of the light dispersing material and a third transparent layer 161c which contains a large quantity of the light dispersing material. In this case, the visible light absorbing material in the first layer 161a absorbs external light so as to enhance the contrast with respect to external light. It goes without saying that the improved effect of the contrast with respect to external light becomes better than that of the conventional lenticular lens sheet which does not contain the visible light absorbing material, as already explained in the first embodiment. However, in comparison with the first embodiment, the improved effect becomes equal to that of the first embodiment. In this fifteenth embodiment, the visible light absorbing material is mingled in the first layer 161a as the surface layer. However, as another example, the visible light absorbing material can be mingled in the second layer 151a or the third layer 151c, or can be mingled into all of the first, second and third layers. Further, it can be mingled in the light dispersing material. It goes without saying that any of these case can similarly offer an improved effect to the contrast.

Sixteenth Embodiment

Figures 23A, 23B:
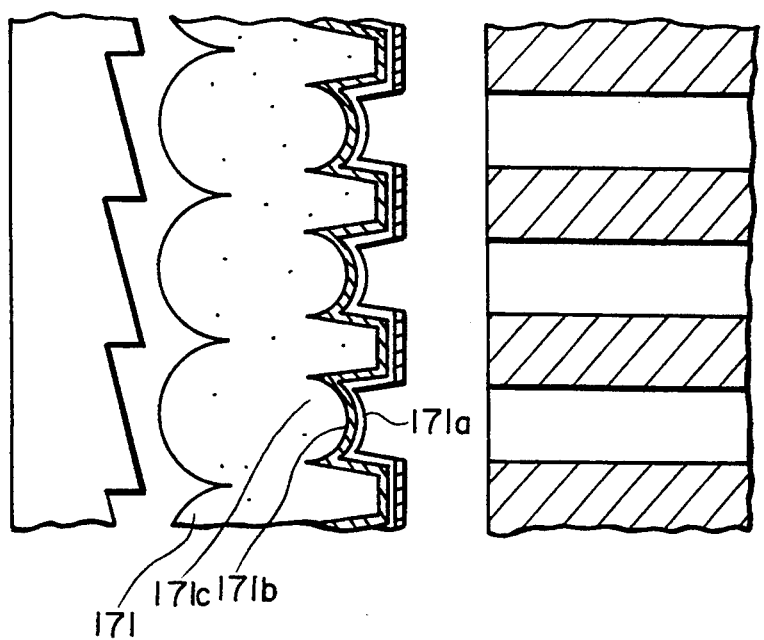

Next, explanation will be made of a sixteenth embodiment of the present invention with reference to FIGS. 23A and 23B.

A lenticular lens sheet 171 is composed of a first layer 171a which contains the visible light absorbing material but does not contain the light dispersing material, a second layer 171b which contains a large quantity of the light dispersing material and a third transparent layer 171c which contains a small quantity of the light dispersing material. In this case, the visible light absorbing material in the first layer 171a absorbs external light so as to enhance the contrast with respect to external light. It goes without saying that the improved effect to the contrast with respect to external light becomes better than that of the conventional lenticular lens sheet which does not contain the visible light absorbing material, as already explained in the first embodiment. However, in comparison with the first embodiment, the improved effect becomes equal to that of the first embodiment. In this sixteenth embodiment, the visible light absorbing material is mingled in the first layer 171a as the surface layer. However, as another example, the visible light absorbing material can be mingled in the second layer 171a or the third layer 171c, or can be mingled into all of the first, second and third layers. Further, it can be mingled in the light dispersing material. It goes without saying that any of these case can similarly offer an improved effect to the contrast.

Although explanation has been made of a triple layer lenticular lens sheet as mentioned above, the light dispersing material and the visible light absorbing material may be mingled in a multiple layer lenticular lens sheet having more than four layers, with various combination. With this arrangement, the contrast can be also improved similarly.

Figure 24:
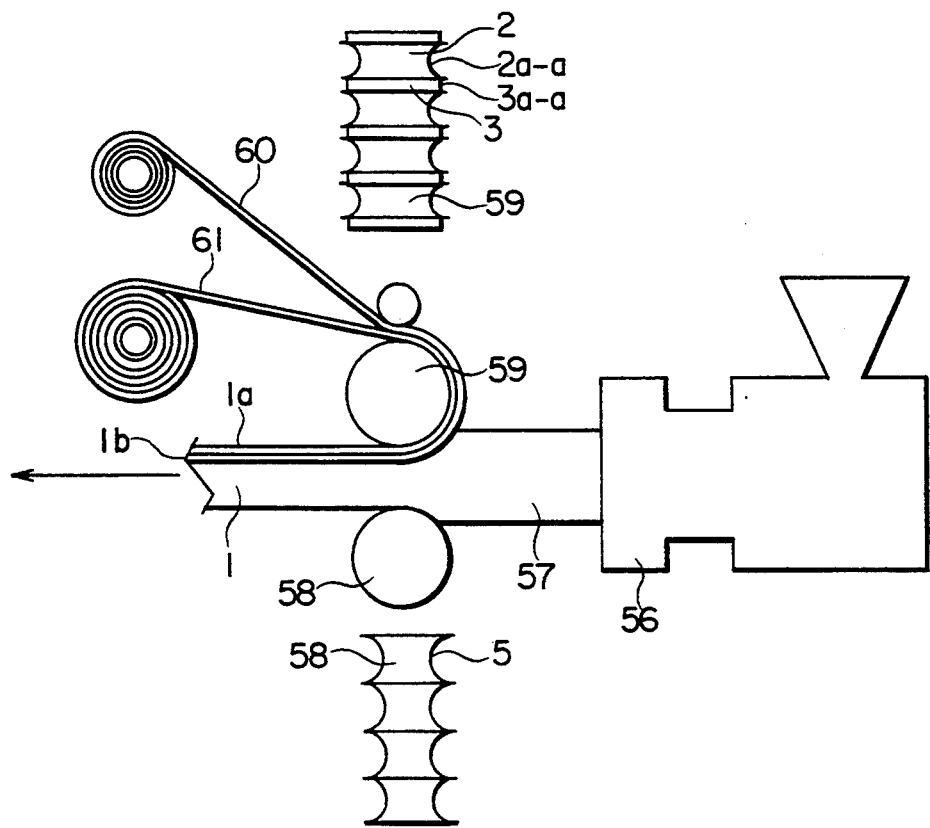
FIG. 24 is a schematic view illustrating an apparatus for producing lenticular lens sheets in the eleventh to sixteenth embodiments of the present invention.

Explanation will be made of an embodiment of a method of producing the screens in the above-mentioned eleventh to sixteenth embodiments, according to the present invention, with reference to FIG. 24.

A lenticular lens sheet base material 57 extruded from an extruder 56 of an extrusion molding machine is led through an incidence side forming roll 58 for forming the incidence side lenticular lens surface and an emission side forming roll 58 for forming the emission side lenticular surface so as to form the lenticular lens sheet 1.

At this time, a first layer thin film sheet 61 made of a transparent resin material which is compatible with the lenticular lens sheet base material 57 and in which the visible light absorbing material is mingled, and a second layer thin film sheet 60 made of a resin material which is similarly compatible and in which the light dispersing material is mingled are fed to the emission side forming roll 59 for forming the emission side lenticular lenses and the black stripe surfaces so as to form the first layer 1a which contains the visible light absorbing material, and the second layer as the intermediate layer which contains the light dispersing material, on the surface which is nearest to the viewer. Further, upon molding, the lenticular lens sheet base material 57 which does not contains the light dispersing material is used as the third layer. Then these three layers are pressed by the incidence side forming roll 58 and the emission side forming roll 59 so as to form the transmission type screen in the eleventh embodiment. Further, by mingling the visible light absorbing material in another layer, a variant form transmission type screen in the eleventh embodiment can be obtained.

Further, by using the resin sheet 61 containing the light dispersing material for the first layer, the compatible transparent resin sheet 60 containing the light dispersing material for the second sheet, and the transparent material for the third layer, the transmission type screen in the twelfth embodiment can be obtained.

Further, by using the lenticular lens sheet base material 57 containing a small quantity of the light dispersing material for the third layer, the resin sheet 61 containing the visible light absorbing material for the first layer, and the compatible transparent resin 60 containing a large quantity of the light dispersing material for the second layer, the transmission type screen in the thirteenth embodiment of the present invention can be obtained.

Further, by mingling the visible light absorbing material and the light dispersing material in the first, second and third layers in various combinations, various kinds of transmission type screens can be produced, in addition to those of fourteenth, fifteenth and sixteenth embodiments.

Further, if lenticular lens forming surfaces 2a-a and black stripe forming surfaces 3a-a on the emission side forming roll 63 are made to be mirror-like, a transmission type screen similar to that of the eighth embodiment can be obtained.

For example, the transmission type screen may be manufactured such that the surface layer does not contain the light dispersing material, the intermediate layer does contain the light dispersing material and the base layer does not contain the light dispersing material. In addition, the visible light absorbing material may be disposed within any one of the surface, intermediate and base layers. Another example would be where the surface layer does not contain the light dispersing material, the intermediate layer does not contain the light dispersing material and the base layer does contain the light dispersing material. In addition, the visible light absorbing material may be disposed within any one of the surface, intermediate and base layers. Yet another example would be where the surface layer contains the light dispersing material, the intermediate layer does not contain the light dispersing material and the base layer does contain the light dispersing material; wherein the base layer contains a greater amount of light dispersing material than the surface layer, or as an alternative, the base layer contains a lesser amount of light dispersing material than the surface layer. In addition, any one of the surface, intermediate and base layers may contain the visible light absorbing material.

Further, if a selective wavelength absorbing material is used as the visible light absorbing material, the transmission type screen similar to that of the seventh embodiment can be obtained. By mingling the selective wavelength absorbing material and the light dispersing material in the first, second and third layers with various combinations, several kinds of transmission type screens can be obtained, as is similar to the first embodiment.

Next, explanation will be made of an embodiment of another method of forming a layer containing the visible light absorbing material or a layer containing no light dispersing material for the first layer.

With the use of an extrusion machine, a lenticular lens sheet 1 composed of the lenticular lens sheet base material 57 which is formed on the incidence side with lenticular lenses 5 and on the emission side with lenticular lenses 2 and black stripes 3 is prepared. Metal or nonmetal, metal oxide or nonmetal oxide such as $MgF_2$, $SiO_2$ or the like are deposited on the lenticular lenses and black stripes on the emission side surface so as to form a thin film or the like, by evaporation, sputtering or the like so as to provide the mirror-surface having an improved transmissivity with less reflection can be obtained.

Naturally, the transparent material can be formed by coating, dipping, printing, painting or the like. Further, there may be used a method in which a film is coated or printed thereover with a transparent material, and then the transparent material is transferred from the film by a hot stamp, a roll or the like for forming a thin film, a method in which a supply sheet is coated or printed thereover with a transparent material with the use of a manufacturing method used for the above-mentioned embodiments, and thereafter, the sheet alone is peeled off therefrom and so forth. If no visible light absorbing material is mingled in the above-mentioned transparent sheet, screens similar to those in the eighth and ninth embodiment can be manufactured. If the visible light absorbing material is mingled therein, screens similar to those in the first to sixth and ten embodiment can be formed.

What is claimed is:

1. A transmission type screen having an incidence side and an emission side, comprising:
    a Fresnel lens means disposed on the incidence side of said screen,
    a lenticular lenses means disposed on the emission side of said screen,
    wherein said lenticular means comprises a surface layer and a base layer, each of which contains a light dispersing material, the content of the light dispersing material is larger in said surface layer than in said base layer, and at least one of said surface layer, said base layer and said light dispersing material contains a visible light absorbing material, the light absorptivity property of said visible light absorbing material being on average (i) less than 50% in a wavelength range of 400 to 490 nm, and (ii) 30% to 80% in a wavelength range of 490 to 700 nm.

2. A transmission type screen having an incidence side and an emission side, comprising:
    a Fresnel lens means disposed on the incidence side of said screen, and
    a lenticular lens means disposed on the emission side of said screen, wherein:
    said lenticular lens means comprises a surface layer (first layer) which is nearest to the emission side and which contains a light dispersing material, an intermediate layer (second layer) which does not contain the light dispersing material, and a base layer (third layer) which contains the light dispersing material in a contact which is smaller than that in said surface layer,
    at least one of said surface layer (first layer), said intermediate layer (second layer), said base layer (third layer) and the light dispersing material contains a visible light absorbing material, and
    the light absorptivity property of said visible light absorbing material is on average (i) less than 50% in a wavelength range of 400 to 490 nm, and (ii) 30% to 80% in a wavelength range of 490 to 700 nm.

* * * * *